(12) United States Patent
Tsuruoka

(10) Patent No.: US 9,674,095 B2
(45) Date of Patent: Jun. 6, 2017

(54) COMMUNICATION NODE

(71) Applicant: FUJITSU LIMITED, Kawasaki-shi, Kanagawa (JP)

(72) Inventor: Tetsumei Tsuruoka, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 104 days.

(21) Appl. No.: 14/557,486

(22) Filed: Dec. 2, 2014

(65) Prior Publication Data

US 2015/0156129 A1 Jun. 4, 2015

(30) Foreign Application Priority Data

Dec. 2, 2013 (JP) ................................. 2013-249286

(51) Int. Cl.
*H04L 12/801* (2013.01)
*H04L 12/823* (2013.01)
*H04L 12/807* (2013.01)
*H04L 12/841* (2013.01)

(52) U.S. Cl.
CPC ............ *H04L 47/193* (2013.01); *H04L 47/27* (2013.01); *H04L 47/323* (2013.01); *H04L 47/283* (2013.01); *H04L 47/32* (2013.01)

(58) Field of Classification Search
CPC ..... H04L 47/193; H04L 47/27; H04L 47/323; H04L 47/283; H04L 47/32
See application file for complete search history.

(56) References Cited

U.S. PATENT DOCUMENTS

| 2002/0176443 | A1* | 11/2002 | Wei | H04L 47/10 370/468 |
| 2002/0181484 | A1* | 12/2002 | Aimoto | H04L 12/5693 370/413 |
| 2006/0050640 | A1 | 3/2006 | Jin et al. | |
| 2007/0049345 | A1* | 3/2007 | Sao | H04L 47/10 455/560 |
| 2007/0280115 | A1* | 12/2007 | Meyer | H04L 47/10 370/236 |
| 2011/0170417 | A1* | 7/2011 | Muramoto | H04L 47/10 370/238 |

FOREIGN PATENT DOCUMENTS

| JP | 2001-510957 | 8/2001 |
| JP | 2008-511205 | 4/2008 |
| JP | 2010-187129 | 8/2010 |
| WO | 9904536 | 1/1999 |

* cited by examiner

*Primary Examiner* — Mohammad Anwar
(74) *Attorney, Agent, or Firm* — Fujitsu Patent Center

(57) ABSTRACT

A communication node disposed on a packet transfer path through which packets flow between an end of a transmitting side and an end of a receiving side according to a specific protocol under which flow control and congestion control using a window size are performed, the communication node including a communication interface configured to perform processing for receiving a packet from a link on the transfer path and processing for transmitting a packet to the link, a storage device configured to store a queue in which a packet in accordance with the specific protocol received from the link or a packet in accordance with the specific protocol transmitted to the link is temporarily accumulated, and a controller configured to adjust a period of time for retaining the packet accumulated in the queue on the basis of the current bandwidth of the link on the receiving side.

13 Claims, 20 Drawing Sheets

| SOURCE IP ADDRESS | SOURCE PORT | DIST. IP ADDRESS | DIST. PORT | STATUS | START TIME | AGING TIMER | FORWARD DIRECTION | RTT VALUE |
|---|---|---|---|---|---|---|---|---|
| 192.168.1.13 | 31024 | 10.22.33.14 | 1014 | SYN | 10:24:13 | 100 | NON-DETERMINATION | -- |
| 192.168.1.221 | 11096 | 70.24.33.13 | 4055 | ESTAB | 10:24:13 | 2 | TRANSMISSION | 120 ms |
| 192.168.1.14 | 33413 | 10.22.33.13 | 3379 | IDLE | 10:24:14 | 1 | TRANSMISSION | 110 ms |
| 192.168.1.14 | 33072 | 160.2.1.23 | 3041 | FIN-W | 10:24:15 | 4 | RECEPTION | 100 ms |
| 192.168.1.221 | 11097 | 158.80.11.5 | 2534 | ESTAB | 10:24:15 | 5 | RECEPTION | 133 ms |
| 192.168.1.13 | 31229 | 170.5.4.4 | 1217 | ESTAB | 10:24:18 | 1 | RECEPTION | 110 ms |
| 192.168.1.13 | 31230 | 161.2.33.7 | 845 | ESTAB | 10:24:18 | 3 | RECEPTION | 105 ms |
| 192.168.1.13 | 31231 | 12.22.33.2 | 406 | ESTAB | 10:24:18 | 4 | TRANSMISSION | 100 ms |
| 192.168.1.13 | 31232 | 11.22.33.8 | 338 | ESTAB | 10:24:18 | 170 | TRANSMISSION | 110 ms |
| 192.168.1.14 | 33414 | 10.220.33.14 | 304 | FIN | 10:24:19 | 11 | TRANSMISSION | 100 ms |
| 192.168.1.14 | 33415 | 10.111.33.14 | 253 | FIN | 10:24:19 | 1 | TRANSMISSION | 100 ms |
| 192.168.1.11 | 5001 | 10.55.3.5 | 101 | IDLE | 10:24:19 | 0 | TRANSMISSION | 150 ms |
|  |  |  |  | NULL |  |  | NULL |  |
|  |  |  |  | NULL |  |  | NULL |  |
|  |  |  |  | NULL |  |  | NULL |  |
|  |  |  |  | NULL |  |  | NULL |  |
|  |  |  |  | NULL |  |  | NULL |  |

FIG. 16A

| Kind=8 | 10 | TS Value (TSval) | TS Echo Reply (TSecr) |
|---|---|---|---|
| 1 | 1 | 4 | 4 |

FIG. 16B

| NOP(=1) | NOP(=1) | TSopt(=8) | 10 |
|---|---|---|---|
| | | TS Value (TSval) | |
| | | TS Echo Reply (TSecr) | |

COMMUNICATION NODE

CROSS-REFERENCE TO RELATED APPLICATION

This application is based upon and claims the benefit of priority of the prior Japanese Patent Application No. 2013-249286, filed on Dec. 2, 2013, the entire contents of which are incorporated herein by reference.

FIELD

Disclosure is related to a communication node.

In networks in recent years, typified by the Internet, the network layer and layers below the network layer support the function of transferring packetized data as a datagram to a destination but do not assure the arrival of the data at the destination. Assurance of end-to-end transfer is fulfilled by using a service in an upper layer above the network layer, e.g., a transport layer, typified by Transport Control Protocol (TCP). Each of communications using an end-to-end transport layer service will be referred to as "connections" below.

A network is used on a best-effort basis in many cases with a network configuration with which end-to-end transfer assurance is made by using a transport layer service such as TCP as described above. Therefore, the amount of transmittable data, i.e., the possible transmission capacity, is changed, for example, according to the amount of traffic through the network.

To cope with changes in possible transmission capacity, TCP has a congestion detection algorithm and controls the amount of communication. Examples of known congestion detection algorithms are one called "tahoe" and an improved version of this called "reno" or "new reno".

For more information, see Japanese National Publication of International Patent Application No. 2008-511205, Japanese National Publication of International Patent Application No. 2001-510957, and Japanese Laid-Open Patent Publication No. 2010-187129

The control of the amount of communication in the congestion detection algorithm described above, however, has been a simple one, as described below. That is, the number of transmission packets per round-trip time (RTT) (called "congestion window") is incremented one by one until discard of packets (usually caused by buffer overflow) is detected. When discard of packets is detected, the number of transmission packets per RTT is reduced to half or the minimum. There is, therefore, a problem that even when a sufficiently wide vacant bandwidth exists in a case where RTT is large, it takes time to increase the throughput to such an extent as to enable effective use of the vacant bandwidth, and that it is not possible to obtain the desired effective communication throughput in such a situation.

In recent years, in particular, forms of wireless connection have been increased in which networks and terminals in accordance with various wireless communication standards such as Long Term Evolution (LTE) and Worldwide Interoperability for Microwave Access (WiMAX) are connected. In such forms, a TCP connection is established over different wireless sections. The bandwidth of a wireless section varies depending on the radio environment (conditions for reception of electric waves to a terminal).

From the viewpoint of obtaining an improvement in throughput, it is preferable to control the rate of transmission of data so as to follow increases or decreases in bandwidth accompanying changes in the radio environment. Even when the bandwidth is increased as a result of a favorable change in the radio environment in the case with above-described congestion detection algorithm, however, it takes time to increase the transmission rate to such a value as to enable use of the added bandwidth. On the other hand, a reduction in transmission rate is caused by an overflow from a buffer (discard of packets). Therefore a retransmission procedure is a hindrance to the improvement in throughput. The above-described problems are not limited to wireless links. There may also be the same problems with wired links in which there is a possibility of a change in bandwidth with an environmental change.

SUMMARY

One of embodiments of the invention is a communication node disposed on a packet transfer path through which packets flow between an end of a transmitting side and an end of a receiving side according to a specific protocol under which flow control and congestion control using a window size are performed. The communication node includes a communication interface configured to perform processing for receiving a packet from a link on the transfer path and processing for transmitting a packet to the link, a storage device configured as queues to store packets in accordance with the specific protocol received from the link or packets in accordance with the specific protocol transmitted to the link is temporarily accumulated, and a controller configured to adjust a period of time for retaining the packet accumulated in the queue on the basis of the current bandwidth of the link on the receiving side.

The target and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 illustrates an example of a data structure of a connection management table;

FIG. 16A illustrates an example of a format of a time stamp option which can be set in an option field of a TCP header;

FIG. 16B illustrates an example of another format of a time stamp option;

DESCRIPTION OF EMBODIMENTS

Embodiments of the present invention will be described below with reference to the drawings. The configurations of the embodiments are an illustrative example. The present invention is not limited to the configurations of the embodiments.

[Example of Network System]

Figure 1:
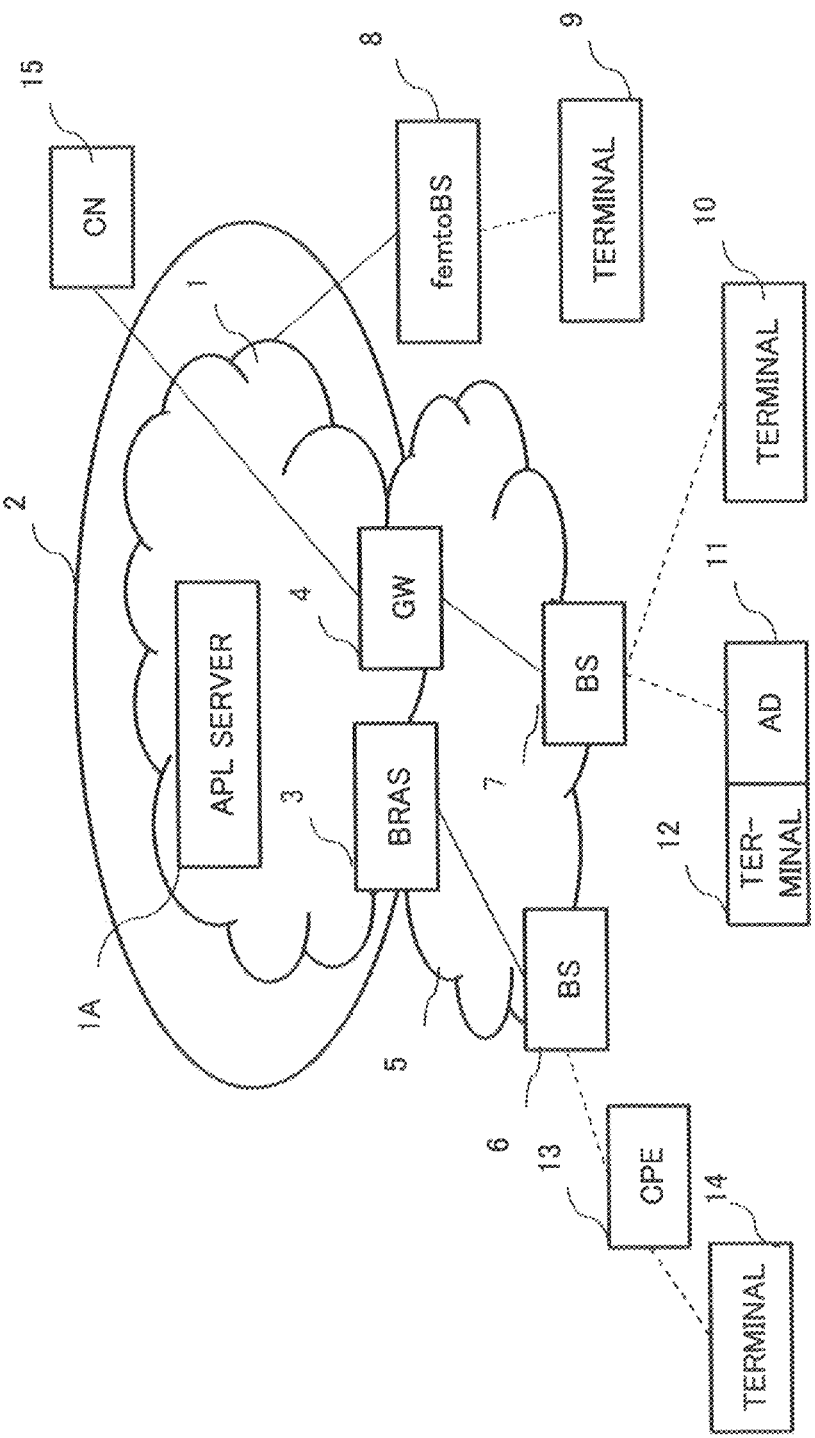
FIG. 1 illustrates an example of a network system configuration according to an embodiment.

FIG. 1 is a diagram illustrating an example of a network configuration to which a traffic controller according to an embodiment of the present invention can be applied. Referring to FIG. 1, there is a provider network 1 managed and operated by a network service provider. The provider network 1 is connected to the Internet 2. The provider network 1 includes a repeater such as a router and an application server (APL server) 1A which provides a service based on an application (APL) to a user (terminal).

The provider network 1 is connected to an access network 5 through a broadband remote access server (BRAS) 3 and through a gateway (GW) 4. The access network 5 is, for example, an E-UTRA (Evolved Universal Terrestrial Radio Access)/E-UTRAN (Evolved Universal Terrestrial Radio Access Network) or any of various wireless networks applied to a wireless LAN (Local Area Network). However, the access network 5 is not limited to a wireless network. The access network 5 may include a LAN. Each of the provider network 1, the Internet 2 and the access network 5 is an example of "network".

The access network 5 includes a wireless apparatus such as a base station (BS), a femto BS or an access point, which performs wireless communication with terminals. FIG. 1 illustrates a BS 6 and a BS 7 connected to the access network 5. The provider network 1 can also has a wireless apparatus which communicates with terminals. A femto BS 8 is illustrated as an example of this wireless apparatus.

A terminal performs direct wireless communication with a wireless apparatus in the access network 5 (BS 6, BS 7, or femto BS 8). Alternatively, the terminal can communicate with the wireless apparatus through a wireless adaptor, apiece of Customer Premises Equipment (CPE) or a communication device having a tethering function (e.g., a smartphone). The CPE includes a mobile router, a broadband router, a set top box, or the like.

FIG. 1 illustrates a terminal 9 which performs wireless communication with the femto BS 8, a terminal 10 which performs wireless communication with the BS 7, a terminal 12 which performs communication with the BS 7 through a wireless adaptor (AD) 11, and a terminal 14 which communicates through a CPE 13.

Each terminal is any of various computers having a TCP/IP communication function, e.g., a smartphone, a feature phone, a cellular phone, a Personal Digital Assistant (PDA), a personal computer (PC) and a workstation. The type of PC may be any of a laptop type, a tablet type and a desktop type. Each terminal can perform TCP/IP communication by establishing a TCP connection with a correspondent node via a network (access network 5, provider network 1).

In the example illustrated in FIG. 1, the terminal 12, for example, is connected to the CN 15 via a communication adaptor 11, the BS 7, the access network 5, the GW 4, the provider network 1 and the Internet 2 and performs TCP communication (TCP/IP communication). At the time of TCP communication, a TCP connection is established between the terminal 12 and the CN 15 and a bidirectional packet flow is produced. The terminal 12 and the CN 15 correspond to the respective "ends". The terminal 12 and the CN 15 perform bidirectional communication. The terminal 10 and the CN 15 are an example of the "transmitting-side end" and the "receiving-side end", respectively.

The traffic controller according to the embodiment is implemented in a device positioned on a TCP connection between ends. For example, the traffic controller is implemented in a communication device (communication node) which performs direct packet transmitting/receiving through a link whose bandwidth varies (typically, a wireless link).

In the example illustrated in FIG. 1, the traffic controller can be implemented in repeaters, such as BS 6, BS 7 and femto BS 8, which function as wireless apparatuses in the network. The traffic controller can also be implemented in terminals (wireless terminals: terminal 9 and terminal 10 in FIG. 1) having the function of directly communicating with the wireless apparatuses in the network. Alternatively, the traffic controller can be implemented in each of the wireless adaptor 11, the CPE 13 and communication devices having a tethering function (repeaters).

Embodiment 1

Figure 2:
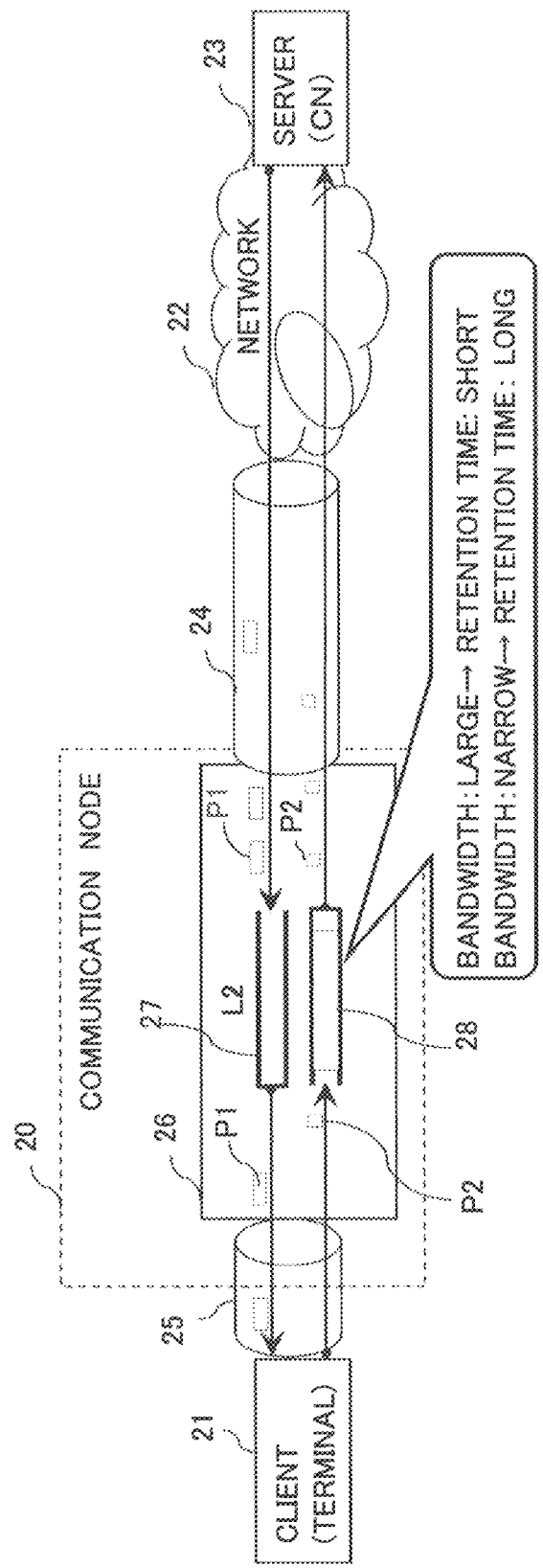
FIG. 2 illustrates an example of a network system to which a communication node including a traffic controller according to Embodiment 1 is applied.

FIG. 2 illustrates an example of a network system to which a communication node including the traffic controller according to Embodiment 1 is applied. The network system illustrated in FIG. 2 is a client server system in which a client 21 performs bidirectional TCP communication with a server (CN) 23 connected through a network 22. The client 21 is connected to the network 22 through a communication node 20 including the traffic controller.

The client 21 corresponds to the terminal described with reference to FIG. 1. The network 22 corresponds to at least one of the access network 5, the provider network 1 and the internet 2 illustrated in FIG. 1. The server 23 corresponds to the CN 15 described with reference to FIG. 1. The communication node 20 corresponds to the CPE 13 illustrated in FIG. 1. The communication node 20 is, for example, a mobile router.

The communication node 20 includes a communication interface (not illustrated) connected to a link 24 on the network 22 side and a communication interface (not illustrated) connected to a link 25 on the client 21 side. The client 21 and the server 23 establish a TCP connection through the link 25, the communication node 20, the link 24 and the network 22 when starting TCP communication.

Packets (TCP/IP packets) are transmitted and received between the client 21 and the server 23 by using the TCP connection (TCP circuit). The communication node transmits (repeats) to the link 25 a packet in the downlink direction received from the link 24, and transmits (repeats) to the link 24 a packet in the uplink direction received from the link 25. The downlink direction is an example of the "first direction", while the uplink direction is an example of the "second direction". Also, the link 24 is an example of the "first link", while the link 25 is an example of the "second link".

By transmitting and receiving of TCP packets, a flow of packets in the direction from the server 23 toward the client 21 (assumed to be the downlink direction) and a flow of packets in the direction from the client 21 toward the server 23 (assumed to be the uplink direction) are produced. These flows are managed as packet flows based on the TCP connection. Each packet flow is identified from a type of protocol (e.g., a port number) and a TCP connection identifier (e.g., a combination of transmission source and destination port numbers and transmission source and destination IP addresses).

The server 23 transmits, by TCP, to the client 21, a TCP/IP packet (called a data packet) P1 containing a data block (called "segment" in TCP) to be provided to the client 21. The data packet P1 includes a sequence number for identification of the data packet P1. When the client 21 receives the data packet P1 in a normal way, it transmits to the server 23 a packet (ACK packet) P2 containing an affirmative reply (Acknowledgement: ACK (acknowledgement reply)) including an acknowledgement reply number corresponding to the sequence number of the packet normally received. The server 23 recognizes, by receiving the ACK packet, that the data packet P1 has been normally received. Upon receiving the ACK packet, the server 23 transmits the next data packet P1. When the client 21 transmits a data packet P1 to the server 23, the operation reverse to that described above is performed.

Figure 3:
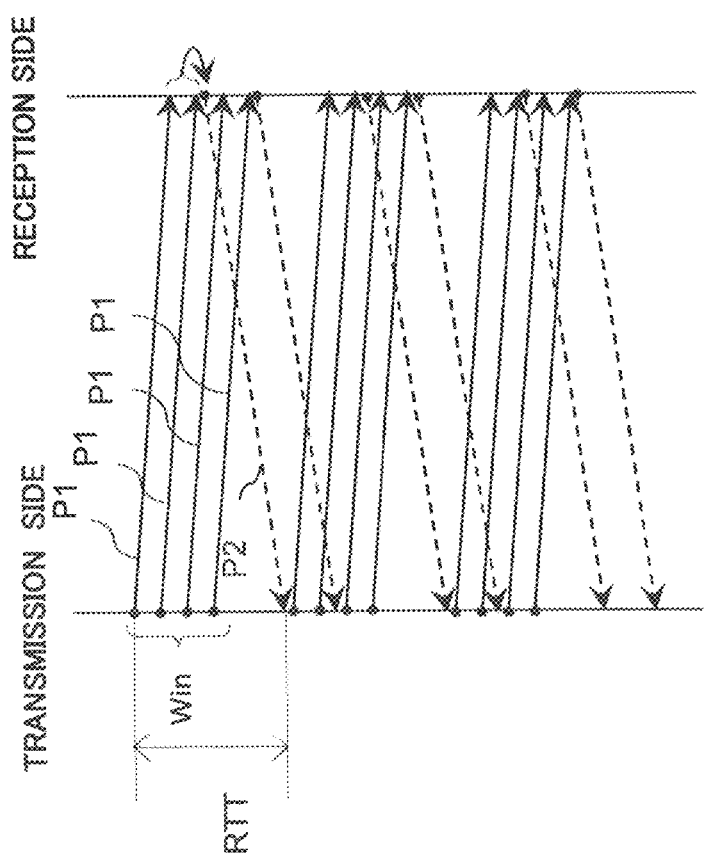
FIG. 3 is a sequence diagram illustrating an example of transfer of data using TCP (transport layer service.

FIG. 3 is a sequence diagram illustrating an example of transfer of data using TCP (transport layer service). The transmitting-side end (referred to simply as "transmitting side" in some cases below, the server 23 in FIG. 2) transmits one or more data packets P1 (solid line arrows) with different sequence numbers according to a window size (Win). The window size represents an amount of data (the number of data packets transmitted per RTT) which can be transmitted without awaiting (receiving) an acknowledgement reply from the receiving-side end (referred to simply as "receiving side" in some cases below, the client 21 in FIG. 2). From the receiving side, an ACK packet P2 (broken line arrow) for the received data packet is transmitted. A plurality of received sequence numbers can be included in the ACK packet P2. In the example illustrated in FIG. 3, ACK packets P2 for pairs of data packets in four data packets P1 are transmitted.

A window size is indicated by an ACK packet P2 from the receiving side. The transmitting side can transmit data packets P1 in the range of a window size without awaiting any ACK packet P2. When the window size is reached by the amount of data transmitted, the transmitting side stops transmitting data packets P1 and awaits reception of an ACK packet P2. When receiving an ACK packet P2, the transmitting side transmits subsequent data packets P1 if the window size indicated by the ACK packet P2 permits transmission of the data packets P1. On the other hand, when failing to receive an ACK packet P2 in a certain time period, the transmitting side retransmits the corresponding data packets P1, thereby assuring transfer of the data packets P1 to client 21. The above-described control is generally called flow control.

On the transmitting side, the time period from transmission of a data packet P1 with a certain sequence number to reception of an ACK packet P2 including an acknowledgement reply number corresponding to the sequence number is observed as round trip time (RTT). A time period (wait time period) during which the transmitting side awaits reception of an ACK packet P2 for a certain data packet P1 is determined on the basis of RTT. If the wait time period ends with no ACK packet P2 received, the transmitting side retransmits the data packet P1.

In TCP, congestion control described below is also performed with the above-described flow control. That is, in TCP, the initial value of the window size is set to a predetermined value (e.g., the minimum) no matter what the window size notified from the receiving side at the time of establishment of the connection is, and the data packet P1 is transmitted to the receiving side. Each time the transmitting side receives an ACK packet P2 for data packets P1 from the receiving side, it gradually increases the window size (e.g., by a value corresponding to one packet per RTT). If no loss of data packets P1 or ACK packets P2 occurs, the window size finally becomes equal to the window size (maximum window size) notified at the time of establishment of the connection. Such window size control is called slow start control. On the other hand, for example, a situation may occur where a data packet P1 is lost by a buffer overflow on the transfer path for data packets P1, and where an ACK packet P2 for the data packet P1 is not received by the transmitting side (while the wait time ends). In such a situation, the transmitting side reduces the window size to a specified value (e.g., half the previous window size or the minimum of the window size) according to the congestion detection algorithm. Thereafter, processing for gradually increasing the window size again according to ACK packet reception conditions is performed through slow start control.

The present embodiment will be described with respect to an example of controlling the time period for stay in a queue of ACK packets P2 to be transmitted to the link 24 according to variation in the bandwidth of the link 24 in the direction in which the communication node 20 receives data packets P1 from the link 24 (the receiving side).

Referring back to FIG. 2, the communication node 20 includes a traffic controller 26. The communication node 20 performs direct transmission/reception of packets in the above-described packet flows (data packets P1, ACK packets P2) on links 24 and 25.

The traffic controller 26 has a queue (buffer) for causing packets in a pack flow (data packets or ACK packets) to stay temporarily. In the example illustrated in FIG. 2, the traffic controller 26 has a queue 27 capable of temporarily accumulating packets in the downlink direction (data packets P1) and a queue 28 capable of temporarily accumulating packets in the uplink direction (ACK packets P2). The traffic controller 26 can adjust (control) the retention time for retaining packets in each of the queues 27 and 28. In the example illustrated in FIG. 2, the retention time for retaining packets in the queue 28 is adjusted (controlled). These queues capable of adjusting (controlling) the retention time may be provided with respect to the two directions, but it may alternatively be provided with respect to only one of the two directions.

The link 24 is, for example, a wireless link having such a characteristic that the bandwidth of the link 24 varies with changes in the environment. The traffic controller 26 has, for example, the link 24 as a link to be monitored, and monitors the bandwidth on the receiving side of the link 24. Description will be made below of a case where the receiving side of the link 24 is a target to be monitored. However, both the bandwidths on the receiving sides of the links 24 and 25 may be targets to be monitored or only the bandwidth on the receiving side of the link 25 may be a target to be monitored. The operation when the link 25 is monitored is the same as the operation and processing described below with respect to the link 24 except details relating to packets and the queue to be controlled different from those described below. The link to be monitored is not limited to the wireless link. A wired link can also be a link to be monitored if its bandwidth varies with changes in the environment.

The traffic controller 26 observes header information including sequence numbers contained in data packets P1, sequence numbers (reply numbers) contained in ACK packets P2 with respect to TCP connections passing through the communication node 20. The traffic controller 26 also observes RTT of packets.

The traffic controller 26 adjusts a retention time for which an ACK packet P2 is delayed (an amount of delay) according to the bandwidth of the link 24. Adjustment of the amount of delay is performed through adjustment of the time period for retaining ACK packets P2 in the queue 28. Adjustment is performed so that the retention time is shorter when the bandwidth on the receiving side of the link 24 is wider, and the retention time is longer when the bandwidth on the receiving side of the link 24 is narrower.

The data bandwidth value [bit/sec] when the window size (Win [bit]) is divided by RTT [sec] represents an effective throughput (Win/RTT=effective throughput). The product of the window size and RTT (Win×RTT) is called a bandwidth delay product (BDP). When the effective throughput is as large as the link bandwidth (BW), (effective throughput=link bandwidth (BW)) is established. The value of the window size as large as BDP therefore means full use of the link bandwidth.

In view of the above, the traffic controller 26 adjusts the amount of delay (retention time), for example, with reference to the value 0 of the amount of delay (retention time) given to the ACK packet P2 when the bandwidth on the receiving side of the link 24 is maximized. More specifically, the traffic controller 26 adjusts the time period for retaining packets (ACK packets P2) in the queue 28 according to an amount of reduction in the bandwidth of the link 24 from the maximum bandwidth. The maximum bandwidth can be set as desired, while its upper limit is the physical bandwidth of the link 24.

That is, the traffic controller 26 adds a delay (expressed as "insert delay" or "insert delay D" below) according to the reduction from the maximum bandwidth such that an increase or decrease in the "bandwidth" in the bandwidth delay product (BDP=Win×RTT) is absorbed by an increase or decrease in "delay (stay time)" to achieve an effect of maintaining the BDP of the path. That is, the traffic controller 26 controls the time period for retaining ACK packets P2 accumulated in the queue 28, thereby enabling maintenance of the transmission rate without changing the congestion window size in the TCP connection.

In other words, an insert delay D satisfying equation (1) below is inserted according to the bandwidth (BW) of the link 24 (bandwidth-varying link) available for communication.

$$(RTT+D) \times BW_{now} = RTT \times BW_{max} \quad (1)$$

where $BW_{now}$ is the bandwidth through which communication can be presently performed in the bandwidth-varying link, and $BW_{max}$ is the maximum of the bandwidth available for communication in the bandwidth-varying link. The insert delay D can be obtained by equation (2) given below, i.e., an equation modified from the above equation (1).

$$D = RTT \times (BW_{max} - BW_{now}/BW_{now}) \quad (2)$$

With the calculation of the insert delay D, the time period for retaining packets in the queue 28 is changed. At this time, it is not preferable to immediately change the present retention time into the retention time according to the insert delay D. A case where the throughput is reduced from the maximum value 30 Mbps to 5 Mbps for example will be considered. In such a case, if the original RTT is 10 ms, the insert delay D when the throughput is 5 Mbps is 50 ms. If this 50 ms delay is applied at a time, a space of 50 ms occurs in the intervals between ACK packets P2 when the delay (retention time) is increased. On the other hand, when RTT is returned to 5 ms, a need may arise to interchange ACK packets P2 in sequential position, depending on the circumstances.

When an increase or decrease in delay amount occurs, therefore, the traffic controller 26 controls the retention time by gradually increasing or decreasing the amount of delay so that the retention time according to the value of the insert delay D is finally reached. Occurrence of an unnecessary packet spacing and outstripping can be avoided by continuously changing the amount of delay in the above-described way.

In a transient stage, a lapse of time ΔT before application (insertion) of a delay accords with a bandwidth $BW_{prev}$ before the change, and the lapse of time ΔT is converted into a value corresponding to the bandwidth $BW_{new}$ after the change. A lapse of time ΔT' appearing after application of the delay is expressed by an equation (3) below.

$$\Delta T' = \Delta T \times BW_{prev}/BW_{new} \quad (3)$$

From equation (3), a change ΔD in the amount of delay added is as expressed by equation (4) below, and a gradient K of change in the amount of delay is obtained by equation (5) given below.

$$\Delta D = \Delta T' - \Delta T = ((BW_{prev}/BW_{new}) - 1)\Delta T \quad (4)$$

The gradient K of change in the amount of delay is obtained by equation (5) given below.

$$K = (BW_{prev}/BW_{new}) - 1 \quad (5)$$

Consequently, the amount of delay D(t) at time t at which the delay is inserted can be expressed by equation (6) below, and the pace of transmission of ACK packets corresponding to $BW_{prev}$ can be converted into the pace of transmission of ACK packets corresponding to the $BW_{new}$ in the transient stage.

$$D(t) = D(t0) + K(t - t0) \quad (6)$$

Figure 4:
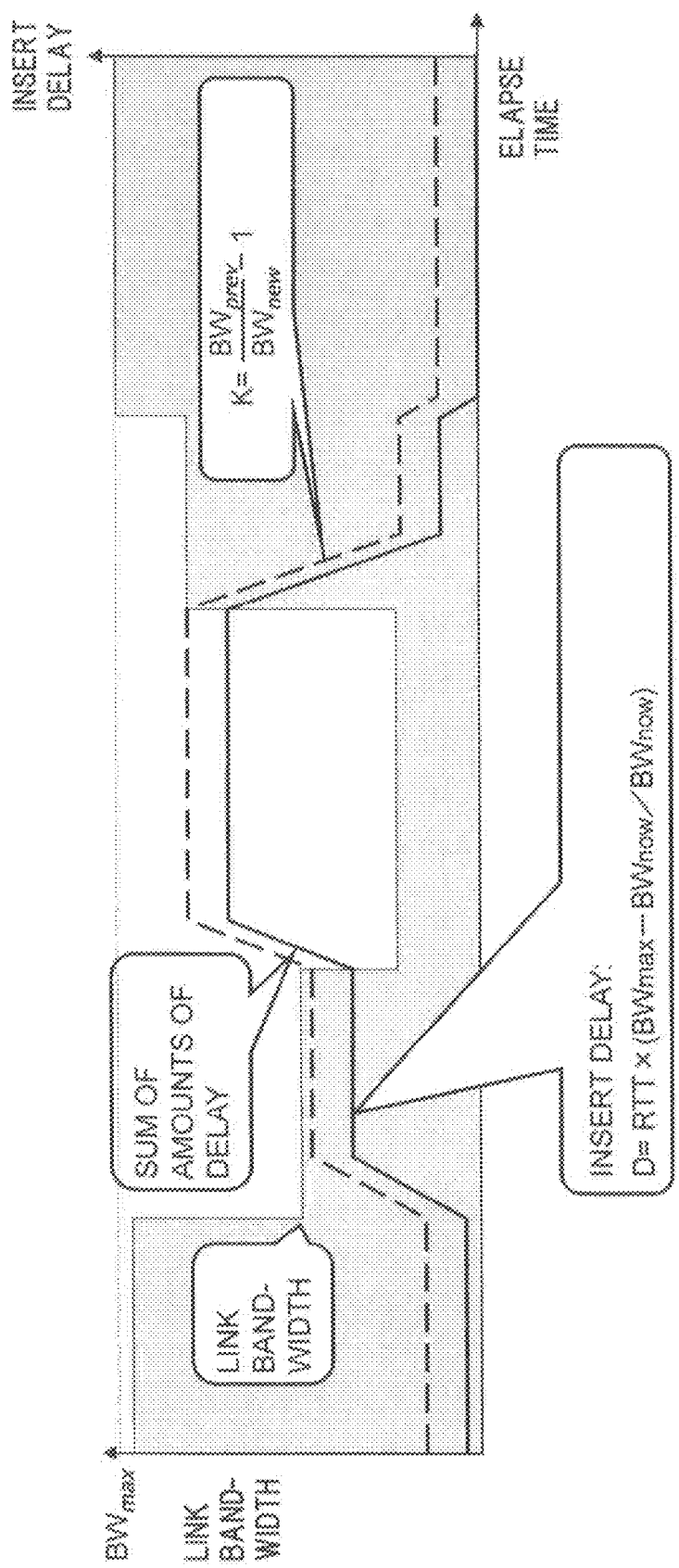
FIG. 4 illustrates an example of changes in inset delay D with respect to changes in link bandwidth (BW)

FIG. 4 indicates an example of changes in the insert delay D with respect to changes in the link bandwidth (BW). The abscissa of the graph depicted in FIG. 4 represents time, while the ordinate represents the link bandwidth (BW) and the amount of delay. The link bandwidth BW can change between 0 and the predetermined maximum value $BW_{max}$. The solid-filled region in the graph indicates changes in the link bandwidth BW with passage of time. The solid-line graph indicates changes in the insert delay D according to the link bandwidth BW. The broken-line graph indicates a delay as the sum of the insert delay D and the delay originally caused including a transmission path delay. Thus, the link bandwidth BW and the insert delay D change in an inversely proportional relationship. The insert delay D, however, gradually changes continuously at the gradient K to a target amount of delay.

Thus, if RTT changes according to changes in the link bandwidth to be monitored with respect to each of individual TCP connections so that the bandwidth delay product (BPD) is maintained, transmission is performed with a correct throughput in such a state that the congestion window size does not change in TCP (a reduction in window size by congestion control can be avoided). In a case where a plurality of TCP connections share the same link, the transmission rates increase or decrease in constant proportions with respect to the TCP connections. All the proportions are therefore maintained.

Figure 5:
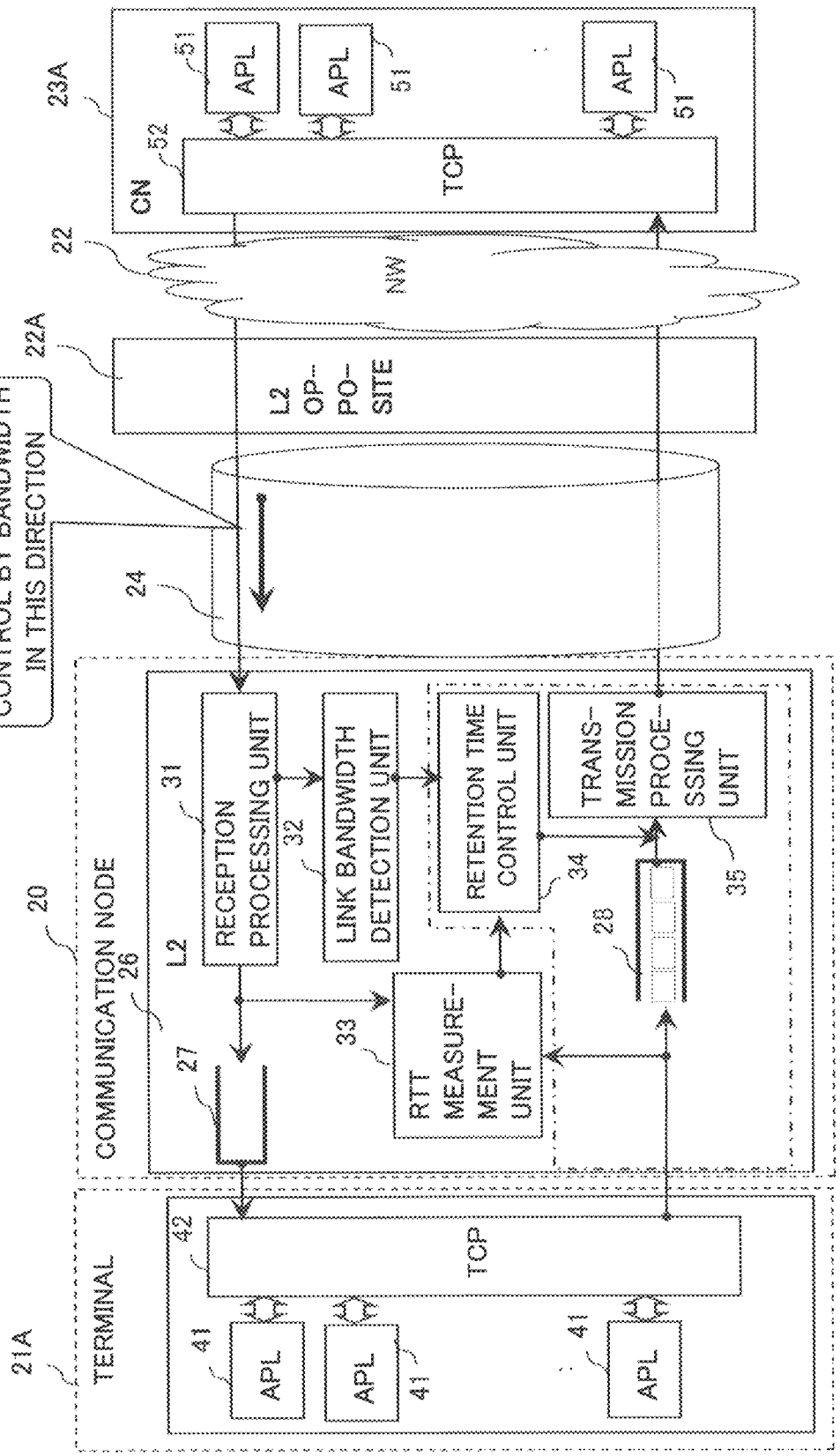
FIG. 5 is a diagram illustrating an example of a configuration of the traffic controller.

FIG. 5 is a diagram illustrating an example of a configuration of the traffic controller. The traffic controller illustrated in FIG. 5 monitors the link 24 in which changes in bandwidth in the downlink direction occur with environmental changes. The traffic controller adjusts the amount of delay (retention time) of an acknowledgement reply packet (ACK packet P2) according to a change in bandwidth in a link to be monitored with respect to a packet flow generated in accordance with TCP or a protocol corresponding to TCP (a protocol by which the above-described flow control and congestion control are performed) and passing through the link.

In the example illustrated in FIG. 5, a configuration capable of dealing with changes in the bandwidth of a link in the downlink direction is illustrated. However, delay insertion can also be applied to the queue in the uplink direction (queue 28) to deal with changes in bandwidth in the uplink direction.

FIG. 5 illustrates a terminal 21A and a correspondent at the other end (Correspondent Node: CN) 23A. The terminal 21A corresponds to the client 21 illustrated in FIG. 2, and the CN 23A corresponds to the server 23 illustrated in FIG. 2. The communication node 20 is connected to the terminal 21A through a link (not illustrated), and is connected to an L2 opposition apparatus 22A connected to the network (NW) 22 through the link 24. The L2 opposition apparatus 22A is, for example, a base station, and the link 24 is a wireless link whose bandwidth varies with environmental changes.

The terminal 21A has a plurality of applications (APL) 41 and a TCP function 42 supporting TCP. The CN 23A also has a plurality of applications (APL) 51 and a TCP function 52, as does the terminal 21A.

One of the APLs 41 in the terminal 21A performs data exchange with one of the APLs 51 in the CN 23A by TCP communication. When TCP communication between the APL 41 and the APL 51 started, a TCP connection is established between the TCP 42 and the TCP 52. Packet flows in the two directions are produced on the TCP connection. These packet flows are a flow in the uplink direction flowing from the terminal 21A and reaching the CN 23A through the communication node 20, the link 24, the L2 opposition apparatus 22A and the NW 22, and a flow in the downlink direction flowing from the CN 23A and reaching the terminal 21A through the NW 22, the L2 opposition apparatus 22A, the link 24 and the communication node 20.

One of the APLs 51 in the CN 23A sends to a TCP function 52 data to be transmitted to the terminal 21A. The TCP function 52 attaches a TCP header to the data. Further, attachment of an IP header and processing in a layer 2 and a layer 1 are performed in the CN 23A and packets are transmitted toward the terminal 21A.

The communication node 20 has the traffic controller 26. The traffic controller 26 has the queue (buffer) 27 in which packets in the downlink direction are temporarily accumulated, and the queue (buffer) 28 in which packets in the uplink direction are temporarily accumulated. The traffic controller 26 further has a reception processing unit 31, a link bandwidth detection unit 32, an RTT measurement unit 33, a stay time control unit 34, and a transmission processing unit 35. The queue 27 accumulates data packets transmitted from the CN 23A, while the queue 28 accumulates ACK packets transmitted from the terminal 21A.

The reception processing unit 31 performs reception processing on packets transmitted from the CN 23A and relating to a TCP connection and sends the packets to the queue 27. The packets accumulated in the queue 27 are read out after a lapse of a predetermined retention time and are sent to the terminal 21A. In the terminal 21A, data in the packets is given to the APL 41 corresponding to the destination through the TCP function 42. The TCP function 42 produces an ACK packet for packets (data packets) and transmits the ACK packet to the communication node 20.

The link bandwidth detection unit 32 detects the bandwidth (communication speed) of the link 24 in the downlink direction. The link bandwidth can be detected, for example, on the basis of information about physical layer control on the link 24. Any of methods existing as link bandwidth measuring methods may be applied.

Figure 6:
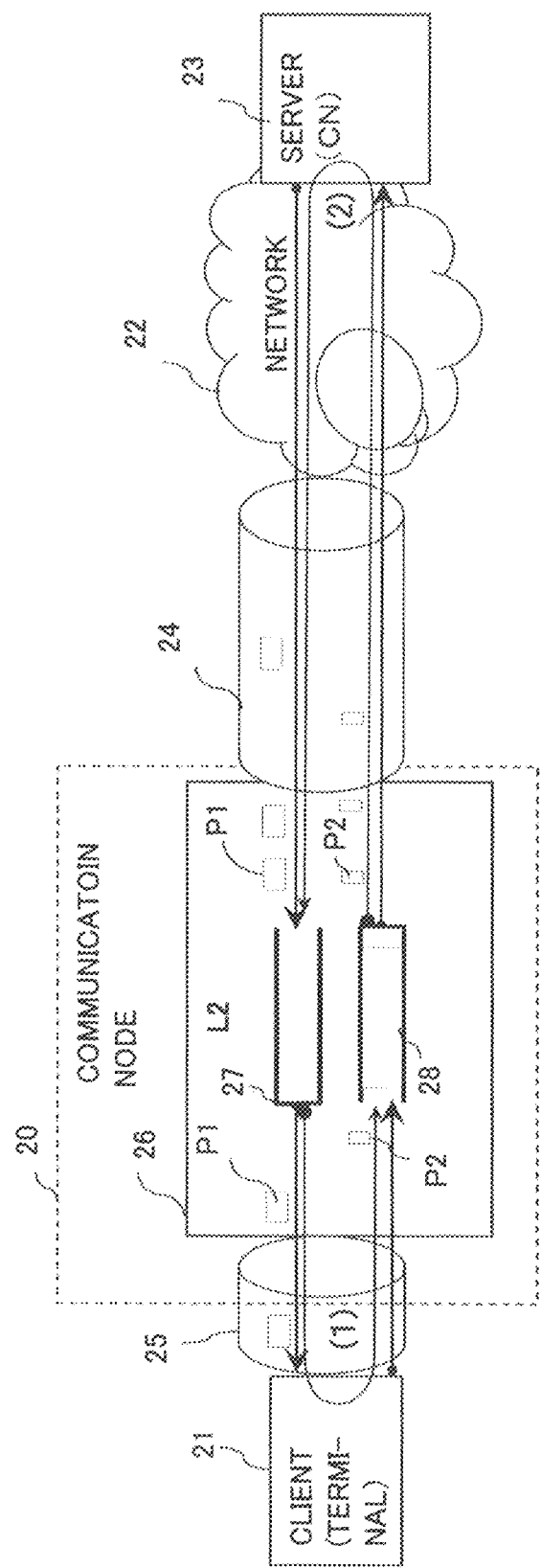
FIG. 6 illustrates an example of an RTT measuring method.

The RTT measurement unit 33 measures RTT relating to a TCP connection. FIG. 6 illustrates an example of an RTT measuring method. RTT is measured by obtaining the sum of a delay time period with respect to a section extending from a predetermined section start point (e.g., the queue 27) to a predetermined section end point (e.g., the queue 28) via the client 21 (terminal 21A) (a section (1) indicated by arrows in FIG. 6) and a delay time period with respect to a section extending from a predetermined start point (e.g., the queue 28) to a predetermined section end point (e.g., the queue 27) via the server 23 (CN 23A) (a section (2) indicated by arrows in FIG. 6).

<<Method 1>>

A procedure described below as method 1 enables measurement. With respect to the section (1), the RTT measurement unit 33 stores the sequence number in a data packet passing the start point of the section (1) (read out from the queue 27) and the corresponding passage time (readout time). Thereafter, the RTT measurement unit 33 detects an arrival time at which an ACK packet containing an acknowledgement reply number corresponding to the stored sequence number reaches the end point (queue 28) of the section (1) and computes the delay time with respect to the section (1) from the difference between the readout time and the arrival time.

On the other hand, with respect to the section (2), the RTT measurement unit 33 stores a time at which a SYN packet or SYN+ACK packet from the terminal 21A to CN 23A transmitted and received at the time of establishment of a TCP connection, passes the start point of the section (2). Thereafter, the RTT measurement unit 33 obtains a time at which a SYN+ACK packet or ACK packet corresponding to the above-mentioned SYN packet or SYN+ACK packet passes the endpoint of the section (2) (e.g., a time at which the packet reaches the queue 27). The RTT measurement unit 33 obtains the delay time with respect to the section (2) from the difference between the passage times. The RTT measurement unit 33 can then obtain RTT by adding together the delay time with respect to the section (1) and the delay time with respect to the section (2).

<<Method 2>>

Alternatively, a method (method 2) using a packet including time stamp information is conceivable as a measuring method applicable both to the section (1) and to the section (2). That is, a time stamp option including time stamp information is specified in Request For Comments (RFC) 1323, and a time stamp value (TS value) for a TCP packet and a corresponding reply value (TS Echo Reply: time stamp echo value) can be stored in an optional header (see FIGS. 16A and 16B).

In this case, the RTT measurement unit 33 stores the time stamp value contained in the packet passing the start point of the section (1) and the corresponding passage time, thereafter detects the time at which the packet having the stored time stamp value as a time stamp echo value reaches the end point of the section (1), and obtains the delay time with respect to the section (1) from the difference between the passage time and the arrival time. The RTT measurement unit 33 also performs similar processing with respect to the section (2) to obtain the delay time with respect to the section (2), and computes the sum of the delay times with respect to the sections (1) and (2) as RTT.

Referring back to FIG. 5, the stay time control unit 34 receives information on the link bandwidth ($BW_{now}$) from the link bandwidth detection unit 32 and receives RTT from the RTT measurement unit 33. The stay time control unit 34 computes the insert delay D by using the information on the link bandwidth and RTT and by using the above equation (2), and computes the gradient K by using equation (5). Further, the stay time control unit 34 computes the delay amount D(t) by using equation (6) and reads out an ACK packet from the queue 28 with the retention time according to the delay amount D(t). The transmission processing unit 35 performs transmission processing on the ACK packet read out from the queue 28. The ACK packet is thereby sent out to the link 24.

If the amount of data transmitted has reached the window size, the CN 23A awaits arrival of an ACK packet and transmits a subsequent data packet. Through adjustment of ACK packet transmission timing, therefore, the throughput (transmission rate) of data packets from the CN 23A is controlled. As illustrated in FIG. 4, the amount of delay (retention time) is increased if the bandwidth of the link 24 is reduced, and the amount of delay (retention time) is reduced if the bandwidth of the link 24 is increased, thus performing control such that the bandwidth and the amount of delay are ideally in an inversely proportional relationship.

Effect and Advantage of Embodiment 1

In Embodiment 1, the retention time for ACK packets in the queue 28 with respect to a packet flow relating to a TCP connection is adjusted on the basis of the receiving-side link bandwidth of the link 24 to be monitored (bandwidth variable link) and RTT. That is, in flow control, after the amount of data transmission on the transmitting side has reached the window size, transmission of data packets from the transmitting side is stopped until reception of an ACK packet. If ACK packets are caused to stay in the queue 28 at this time, arrival of an ACK packet at the transmitting side is delayed and the time at which data packets are transmitted from the transmitting side is retarded. That is, the amount of data transmission per unit time on the transmitting side is reduced. This is an effect in such direction that a buffer overflow on the path for transfer of data packets can be avoided. As described above, the time period for stay in the queue 28 is determined according to the amount of reduction from the maximum bandwidth of the link 24 on the receiving side. Therefore, no large reduction in window size due to congestion control occurs as long as each ACK packet read out from the queue 28 arrives at the transmitting side in the wait time period without being lost on the packet transfer path. That is, the rate of transmission of data packets (throughput) is reduced according to the reduction in the bandwidth of the link 24 on the receiving side while the window size is maintained. On the other hand, when the bandwidth of the link 24 on the receiving side is increased from a certain value toward the maximum bandwidth, the time period for retaining ACK packets in the queue 28 is shortened. The time at which an ACK packet arrives and the time at which a data packet is transmitted from the transmitting side are thereby advanced. Accordingly, the amount of data transmission per unit time increases with the increase in the link 24 on the receiving side. Thus, in Embodiment 1, transmission rate (throughput) adjustment can be performed by maintaining the window size such that changes (reductions and increases) in the bandwidth of the link 24 on the receiving side can be followed in a shorter time period in comparison with transmission rate control by TCP congestion control (i.e., a large reduction in window size accompanying ACK packet reception failure (e.g., loss of a data packet) and an increase in widow size due to slow start control).

In other words, the traffic controller according to Embodiment 1 is provided in a communication node (a communication adaptor, a repeater, or the like) which performs transmitting and receiving on a link such as a wireless link whose bandwidth varies depending on environmental conditions. If a traffic flowing through a link has TCP or a throughput (traffic) control mechanism corresponding to TCP, the traffic controller related to the link can adjust the throughput according to the bandwidth of the link by adjusting the amount of delay added according to the link bandwidth.

<Example of Modification>

The configuration of Embodiment 1 can be modified as described below. For example, the protocol to which traffic control that changes the insert delay D according to a change in link bandwidth BW as described above is applied is not limited to TCP. An application of the traffic control to a protocol using a throughput control method (flow control and congestion control) equivalent to that in TCP is also possible. While the increase or decrease of insert delay D with respect to one TCP connection (packet flow) has been described in the above-described example, this control can also be executed on a plurality of TCP connections or traffic with a combination of TCP and a non-TCP protocol.

An example of adjustment of the time period for retaining ACK packets in downlink transfer has been described with reference to FIGS. 2 and 5. However, the traffic controller 26 can also adjust the time period for retaining ACK packets in uplink transfer.

Figure 7:
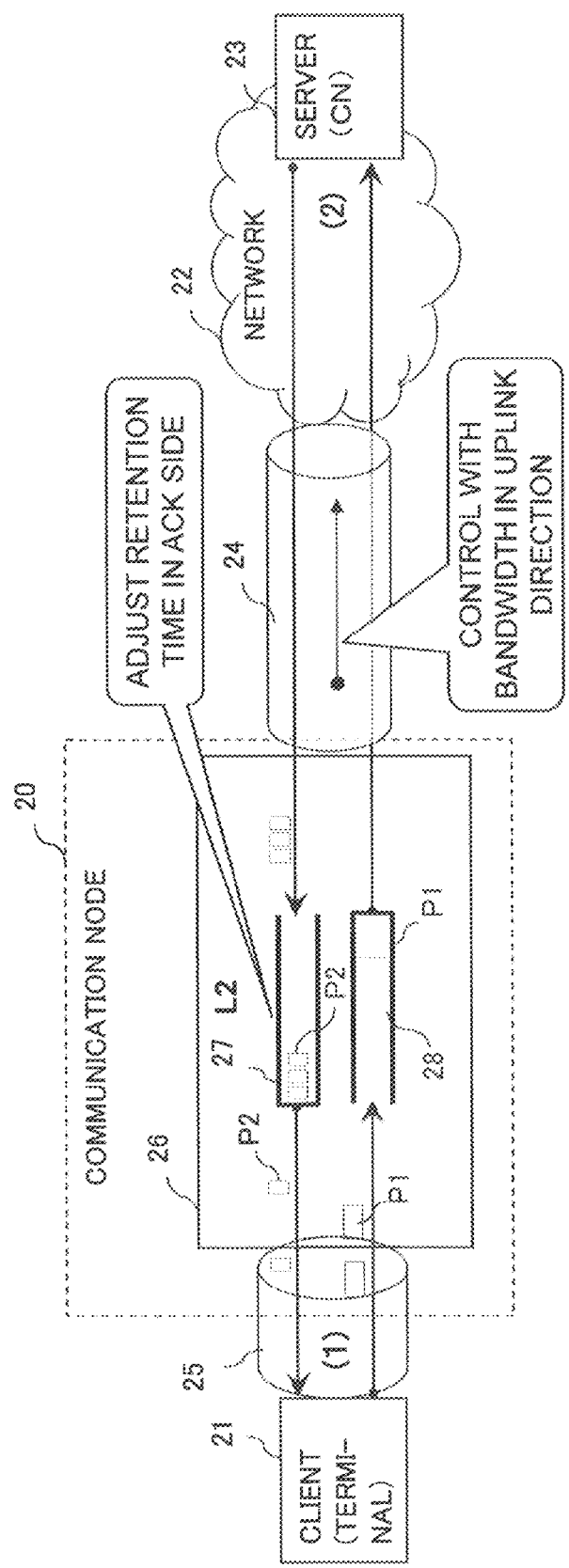
FIG. 7 illustrates an example of retention time adjustment in uplink transfer.

FIG. 7 illustrates an example of retention time adjustment in uplink transfer. In uplink transfer, data packets P1 are transferred from the client 21 to the server 23 and ACK packets are transferred from the server 23 to the client 21. In this case, control (retention time adjustment) is performed to increase or decrease the insert delay D with respect to ACK packets P2 in the queue 27 in place of the queue 28 according to increases or decreases in the bandwidth of the link 24 in the uplink direction. Details of this control are the same as that on the queue 28 in Embodiment 1 and the description of them will not be repeated. The traffic controller 26 can execute ACK packet retention time adjustment with respect to upload transfer in place of downlink transfer or with respect to both downlink transfer and uplink transfer.

An example of adjustment of the amount of delay (retention time) of ACK packets P2 in the queue 28 (FIG. 2) and the queue 27 (FIG. 5) has been described with reference to FIGS. 2 and 7. However, increase or decrease of the amount of delay (retention time adjustment) of data packets P1 in at least one of the queue 27 and the queue 28 may be performed in addition to or in place of ACK packet retention time adjustment.

Embodiment 2

Embodiment 2 of the present invention will subsequently be described. Embodiment 2 has a configuration similar to that of Embodiment 1 and will therefore be described mainly with respect to points of difference from Embodiment 1 without repeating the description of the common components.

Embodiment 1 has been described with respect to traffic control on a packet flow relating to TCP or a protocol corresponding to TCP, i.e., a protocol which enables control of the throughput (transmission rate) using RTT and window size control (flow control and congestion control).

However, a terminal and a correspondent at the other end (CN) also perform communication, for example, based on a protocol other than TCP (referred to as "non-TCP protocol"), e.g., User Datagram Protocol (UDP) in ordinary cases. Embodiment 2 will be described with respect to a traffic controller which enables selection as to whether or not an additional delay (insert delay D) is to be given with reference to a type of protocol for packets.

Figure 8:
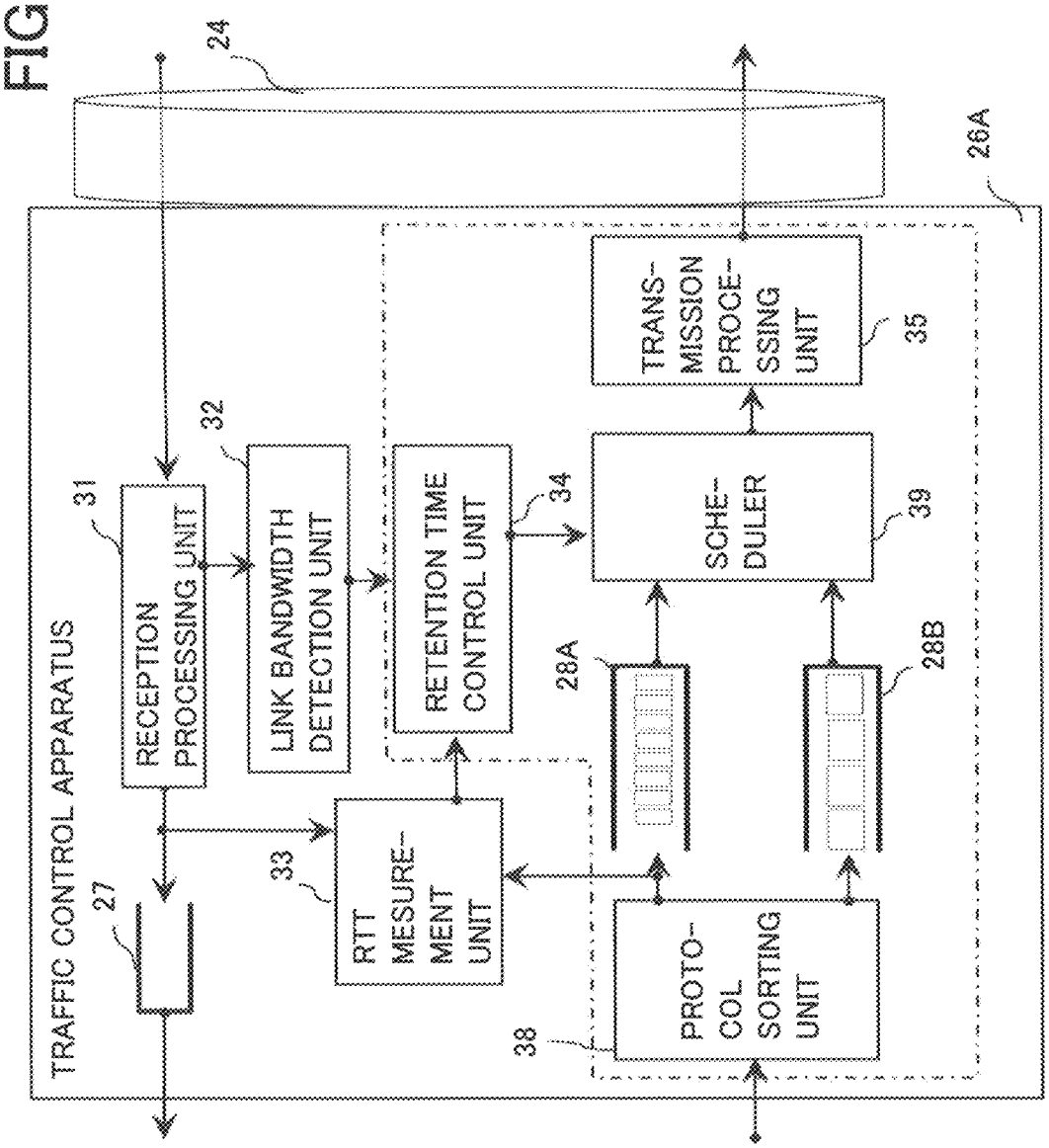
FIG. 8 illustrates an example of a configuration of a traffic controller according to Embodiment 2.

FIG. 8 illustrates an example of a configuration of a traffic controller according to Embodiment 2. Embodiment 2 differs from Embodiment 1 in that a traffic controller 26A is applied in place of the traffic controller 26 in the configuration of Embodiment 1 (FIG. 5). However, the components other than the traffic controller 26A are the same as those of Embodiment 1 (FIG. 5), and the description of the same components will not be repeated.

Referring to FIG. 8, the traffic controller 26A differs from the traffic controller 26 (FIG. 5) in respects described below. That is, the traffic controller 26A further includes a protocol sorting unit 38 which receives packets from the terminal 21A, a control-target queue 28A, a non-control-target queue 28B and a scheduler 39 in addition to the components provided in the traffic controller 26.

The protocol sorting unit 38 is an example of a protocol determination unit. The protocol sorting unit 38 determines a type of protocol for a received packet, for example, on the basis of an identifier of protocol attached to the header of the packet. The protocol sorting unit 38 sorts the packet into the control-target queue 28A if the type of protocol for the packet is TCP (including a protocol by which the same flow control and congestion control as those in accordance with TCP are performed). The protocol sorting unit 38 sorts the packet into the non-control-target queue 28B if the type of protocol for the packet is a non-TCP protocol.

The control-target queue 28A (queue 28A) corresponds to the queue 28 in Embodiment 1 and temporarily accumulates TCP packets. The time period for retaining packets in the queue 28A is adjusted by the stay time control unit 34 by the method described in the description of Embodiment 1. The non-control-target queue 28B (queue 28B) temporarily accumulates non-TCP packets.

The scheduler 39 reads out TCP packets from the queue 28A and non-TCP packets from the queue 28B according to a packet readout schedule in which readout timing based on the insert delay D (delay amount D(t)) computed by the stay time control unit 34 is reflected, and supplies the read packets to the transmission processing unit 35.

Throughput adjustment can be performed if a delay is inserted in one connection in one of the downlink direction (forward path) and the uplink direction (backward path), as described in the description of Embodiment 1. The arrangement may therefore be such that with respect to a TCP packet flow, only ACK packets corresponding to packets in the backward path are sorted into the queue 28A and packets other than the ACK packets are sorted into the queue 28B. In such a case, the protocol sorting unit 38 refers to the header of a TCP packet, sorts the TCP packet into the queue 28A only if the TCP packet is an ACK packet, and sorts packets other than ACK packets into the queue 28B.

In Embodiment 2, the protocol sorting unit 38 determines the types of protocols for packets and stores non-TCP packets which do not need to be additionally delayed (stay time controlled) into the queue 28B different from the queue 28A for TCP packets, thus enabling selection as to whether or not any additional delay (insert delay D) is to be provided with reference to the type of protocol for a packet.

Embodiment 3

Embodiment 3 of the present invention will subsequently be described. Embodiment 3 has a configuration similar to that of Embodiment 1 and will therefore be described mainly with respect to points of difference from Embodiment 1 without repeating the description of the common components.

In Embodiment 3, computation of RTT is performed with respect to each of TCP connections (packet flows). A TCP connection can be established, for example, for each APL 41 (FIG. 5). In other words, a plurality of TCP connections may be established in parallel between the terminal 21A and CN 23A, or a situation may occur where a plurality of TCP connections between different ends pass through the communication node 20.

The RTT value is the sum of delays in the entire end-to-end path (packet flow), as described in the description of Embodiment 1. The RTT value therefore varies connection by connection. Embodiment 3 will be described with respect to a configuration for adjusting the amount of delay (retention time) of packets on a connection-by-connection basis.

Figure 9:
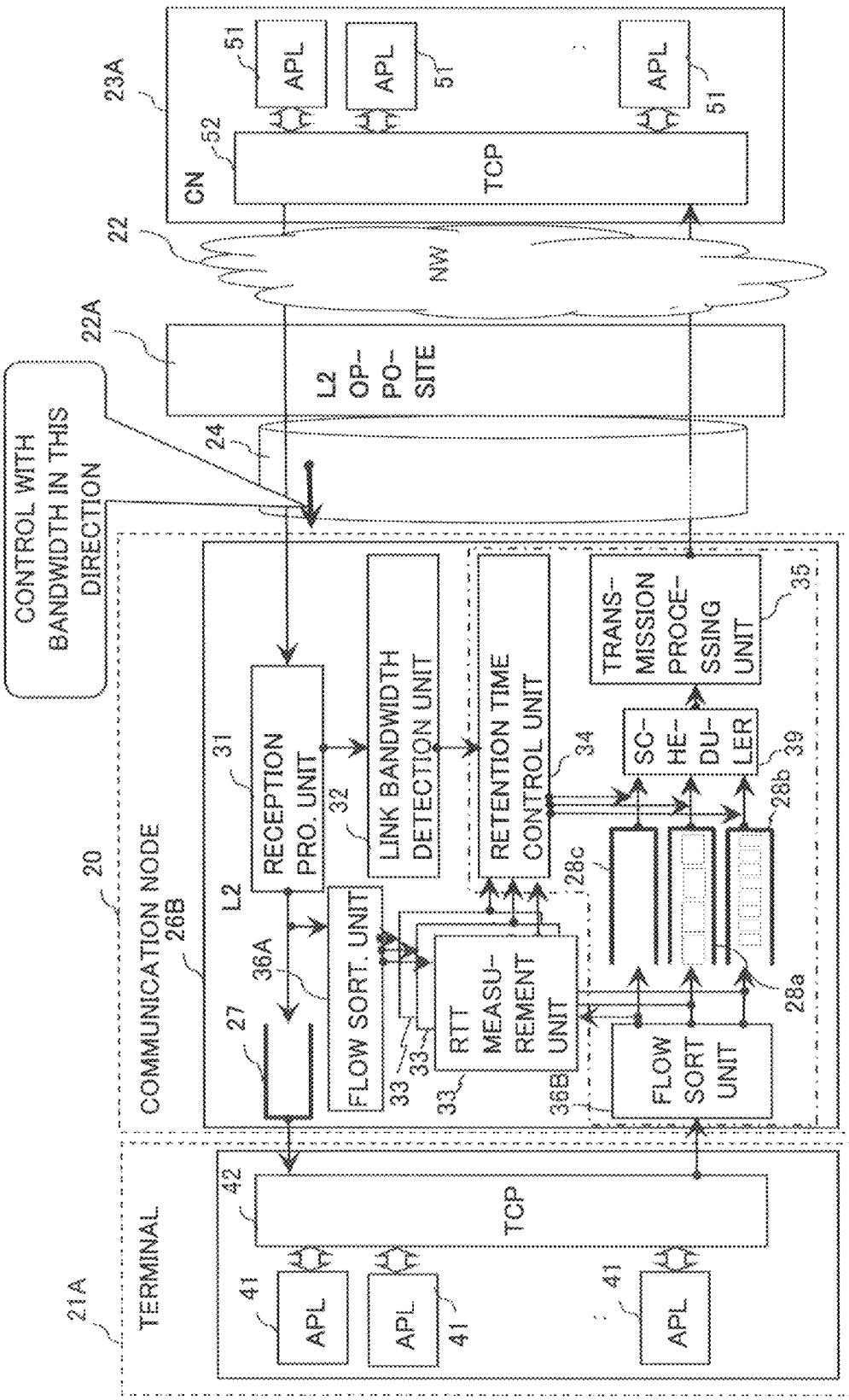
FIG. 9 is a diagram illustrating an example of a configuration of a traffic controller according to Embodiment 3.

FIG. 9 is a diagram illustrating an example of a configuration of a traffic controller according to Embodiment 3. The following is a difference from Embodiment 1 (FIG. 5). That is, a downlink-side flow sorting unit 36A which determines a flow of packets output from the reception processing unit 31 and an uplink-side flow sorting unit 36B which determines a flow of packets received from the terminal 21A are provided.

The flow sorting unit 36A and the flow sorting unit 36B determine a TCP connection on the basis of an identifier (e.g., a transmission source and destination port numbers and transmission source and destination IP addresses) for a packet flow (TCP connection) stored in the header of a packet input to the queue 27. The RTT measurement unit 33 is provided for each of flows (connections) to measure RTT on a connection-by-connection basis.

A plurality of queues are provided in a stage subsequent to the flow sorting unit 36B. In the example illustrated in FIG. 28, queues 28a and 28b provided for each of control-target flows (connections) and a queue 28c for a non-control-target flow are illustrated. The number (2) of control-target queues is an illustrative example. Queues corresponding to a certain number of connections are prepared.

The stay time control unit 34 computes the insert delay D, gradient K and delay amount D(t) with respect to each flow and adjusts the time period for retaining packets (ACK packets) in the corresponding queue. The scheduler schedules timing (transmission times) of readout of packets from the queues so as to avoid competition between readouts from the queues.

Thus, in Embodiment 3, computation of amounts of delay on a connection-by-connection basis and preparation of queues (queues 28a and 28b) for adjusting the time period for retaining ACK packets with respect to each of connections are included in consideration of connection-by-connection variation in the RTT value. Provision of the amount of delay to the packet flow according to RTT in each connection is thereby enabled to achieve traffic (throughput) control with improved accuracy.

Embodiment 4

Embodiment 4 of the present invention will subsequently be described. Embodiment 4 corresponds to an example of modification of Embodiments 2 and 3. Embodiment 4 has a configuration similar to those of Embodiments 2 and 3 and will therefore be described mainly with respect to points of difference without repeating the description of the common components.

Figure 10:
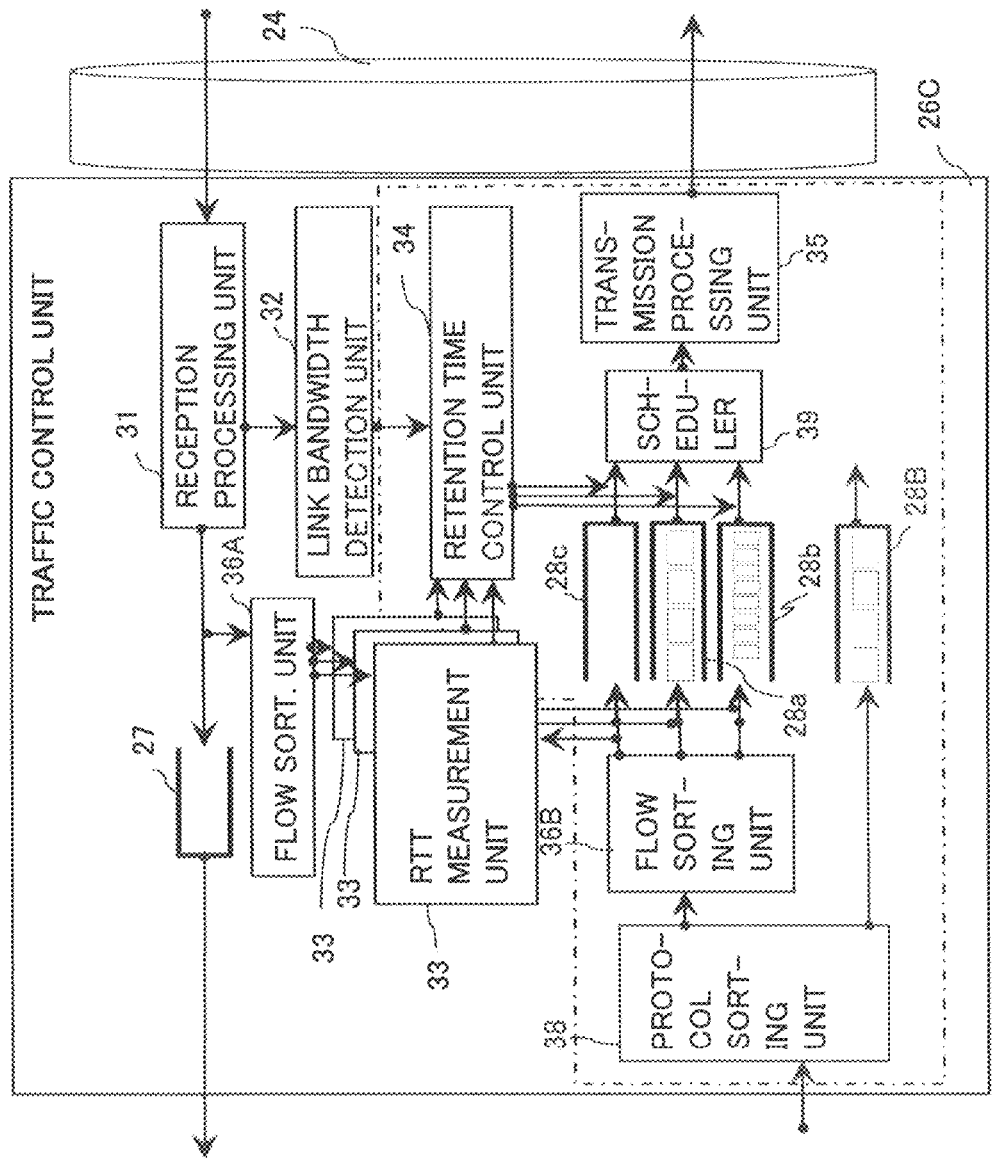
FIG. 10 illustrates an example of a configuration of a traffic controller according to Embodiment 4.

FIG. 10 illustrates an example of a configuration of a traffic controller 26C according to Embodiment 4. Embodiment 4 has the same configuration as that of Embodiment 3 illustrated in FIG. 9 except for the configuration of a traffic controller 26C. Therefore, some references to the components illustrated in FIG. 9 may be made with respect to the components other than the traffic controller 26C.

The traffic controller 26C illustrated in FIG. 10 differs from a traffic controller 26B (FIG. 9) in Embodiment 3 in respects described below. That is, the traffic controller 26C has the protocol sorting unit 38 described in the description of Embodiment 2. The protocol sorting unit 38 receives a packet transmitted from the terminal 21A and determines the type of protocol for the packet. If the type of protocol is TCP, the protocol sorting unit 38 delivers the packet to the flow sorting unit 36B. If the type of protocol is a non-TCP protocol, the protocol sorting unit 38 stores the packet in the queue (buffer) 28B for non-TCP packets.

The scheduler 39 schedules timing (transmission times) of readout of packets from the queues 28a, 28b, and 28c and the queue 28B, reads out a packet from each queue according to the transmission time from the corresponding queue, and sends the read packet to the transmission processing unit 35.

The traffic controller 26C in Embodiment 4 enables obtaining both the effect and advantage of Embodiment 2 and the effect and advantage of Embodiment 3.

Embodiment 5

Embodiment 5 of the present invention will subsequently be described. Embodiment 5 shares commonalities with Embodiments 1 to 4 and will therefore be described mainly with respect to points of difference without repeating the description of the commonalities.

Figure 11:
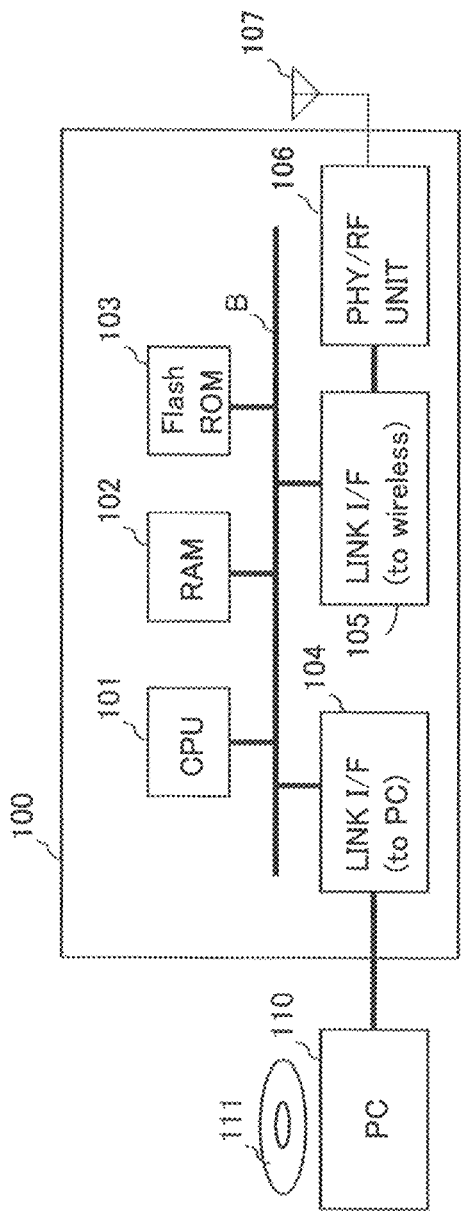
FIG. 11 illustrates an example of a hardware configuration of a communication adaptor according to Embodiment 5.

FIG. 11 illustrates an example of a hardware configuration of a communication adaptor according to Embodiment 5. Referring to FIG. 11, a communication adaptor 100 has a communication interface (I/F) such as Universal Serial Bus (USB) or Ethernet (trademark) for interfacing with a PC 110 and has a wireless connection function such as LTE or WiMAX for connection with a wireless apparatus (base station, AP). The communication adaptor 100 is an example of a "communication node".

The communication adaptor 100 can be applied to the adaptor 11 illustrated in FIG. 1. The PC 110 illustrated in FIG. 11 can be applied to the terminal 12 illustrated in FIG. 1. Each of the terminals 9 and 10 illustrated in FIG. 1 has a hardware configuration in which the PC 110 incorporates the communication adaptor 100.

There are certain forms of connection between the terminal 110 and the communication adaptor 100: a first connection form in which a terminal and a communication adaptor are connected to each other by a cable; a second connection form in which a communication adaptor is detachably connected to a terminal by a connector; and a third connection form in which a communication adaptor is incorporated in a terminal. Any of the first, second and third connection forms may be adopted.

The communication adaptor 100 includes a central processing unit (CPU) 101, a random access memory (RAM) 102, a flash read only memory (flash ROM) 103, a link interface (link I/F) 104, and a link interface (link I/F) 105 connected through a bus B. A PHY/RF unit 106 is connected to the link I/F 105. An antenna 107 is connected to the PHY/RF unit 106. The link I/F is an example of a "communication interface".

The RAM 102 is used as a work area for the CPU 101. The flash ROM 103 is an example of a nonvolatile storage medium. The flash ROM 103 stores various programs to be executed by the CPU 101, and data used when each program is executed. Each of the RAM 102 and the flash ROM 103 is an example of a "storage device" or a "computer-readable recording medium".

The link I/F 104 is a communication interface circuit connected to the PC 110, which is an example of a terminal. The link I/F 104 supports, for example, Ethernet (trademark) and performs processing on packets in a layer 2 and layers below the layer 2. The link I/F 105 is a communication interface circuit for wireless connection. The link I/F 105 performs processing on packets in the layer 2 and layers below the layer 2. The PHY/RF unit 106 is a circuit for performing processing relating to physical layers and processing relating to radio signals. Wireless communication with the access network 5 (base station) can be performed by using the link I/F 105, the PHY/RF unit 106 and the antenna 107. Each of the link I/F 104 and the link I/F 105 is an example of a "communication interface".

The PC 110 is, for example, a general-purpose personal computer and is loaded with one or more applications (APL). The PC 110 supports TCP/IP and can perform TCP communication by establishing a TCP connection with a correspondent at the other end (CN).

The PC 110 has a drive device or a reader (not illustrated) for a portable storage medium 111 such as disk storage medium (CD-ROM, DVD-ROM, or the like) or a flash memory. The PC 110 can install in the flash ROM 103 of the communication adaptor 100 a program for traffic control stored in the storage medium 111.

The CPU 101 executes the traffic control program installed in the flash ROM 103 by loading the program on the RAM 102, thereby performing processing for enabling the communication adaptor 100 to function as a communication node including the traffic controller.

The PC 110 performs wireless connection with an LTE base station or a WiMAX base station (AP) through the communication adaptor 100 and is connected to a correspondent at the other end (CN) through the network to which the base station is connected. The PC 110 can communicate with the CN.

Figure 12:
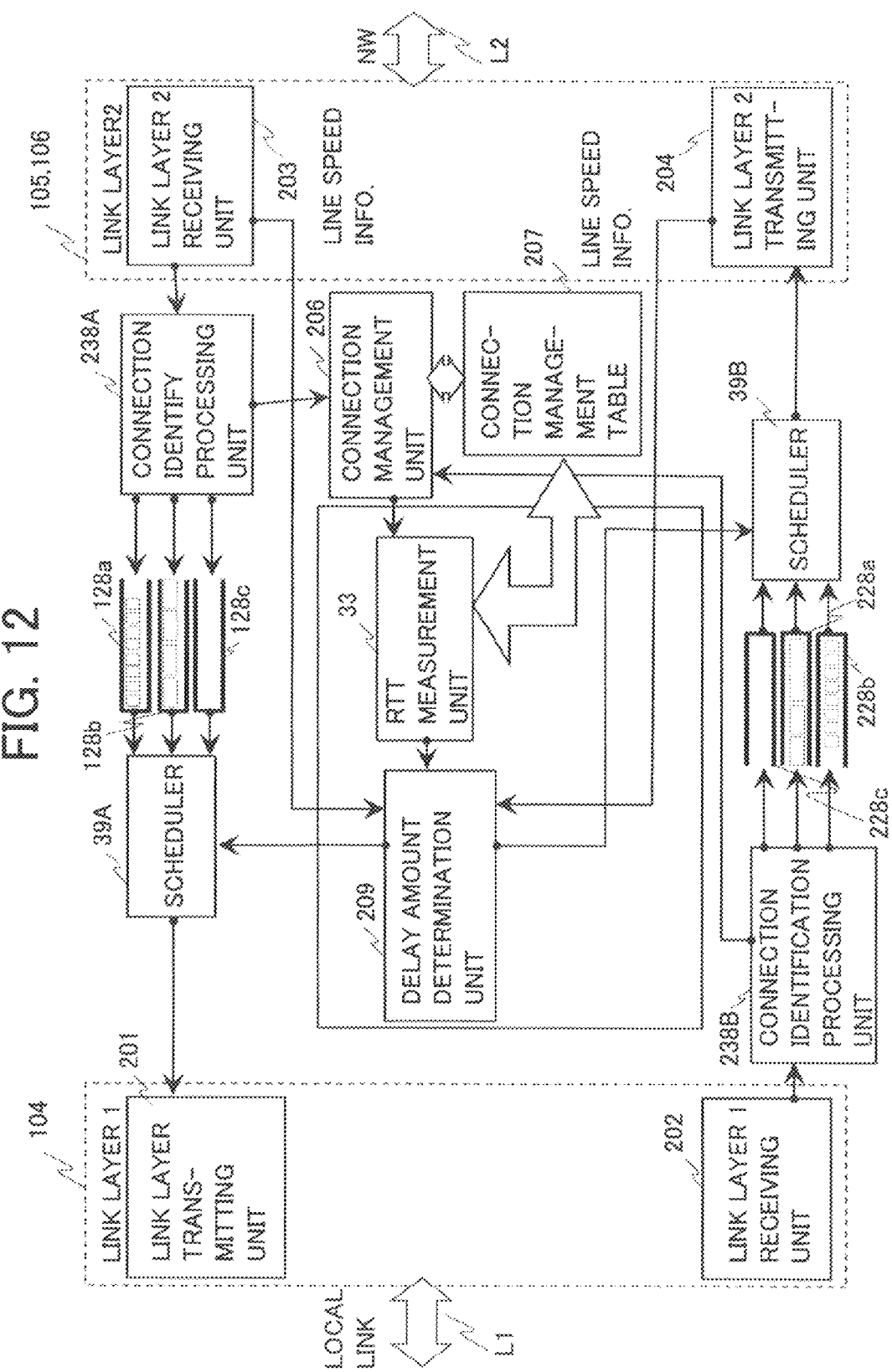
FIG. 12 schematically illustrates functions produced by a CPU executing a program for traffic control.

FIG. 12 schematically illustrates functions produced by the CPU 101 executing the traffic control program. Referring to FIG. 12, a local link is an interface (referred to as "link layer 1" or "first link layer L1") connected to the PC 110, which is generated by the link I/F 104. The link I/F 104 functions as a transmitting unit 201 of the link layer 1 and a receiving unit 202 of the link layer 1.

On the other hand, the link on the "network" side (referred to as "link layer 2" or "second link L2") is a wireless link connected to the base station (NW). The bandwidth (communication speed) of this link varies with passage of time. The link layer 2 (second link L2) is a link to be monitored. The link I/F 105 and the PHY/RF unit 106 function as a receiving unit 203 of the link layer 2 and a transmitting unit 204 of the link layer 2. The receiving unit 203 corresponds to the reception processing unit 31 (FIG. 9). The transmitting unit 204 corresponds to the transmission processing unit 35 (FIG. 9).

A connection identification processing unit 238A, queues 128a, 128b, and 128c and a scheduler 39A are disposed on a packet transfer path in the downlink direction (NW→PC) between the receiving unit 203 and the transmitting unit 201.

The connection identification processing unit 238A (identification processing unit 238A) has functions equivalent to those of the flow sorting unit 36A and the protocol sorting unit 38 (FIG. 10). The identification processing unit 238A identifies the type of protocol for a packet received by the receiving unit 203 and a packet flow (TCP connection) and stores (sorts) the packet into one of the queues 128a, 128b, and 128c.

The queues 128a, 128b, and 128c are disposed in a stage subsequent to the identification processing unit 238A. Each of the queues 128a and 128b is a queue (buffer) in which control-target packets (on which retention time adjustment is performed) are stored. The queues 128a and 128b correspond to the queues 28a and 28b (FIG. 9). The queue 128c is a queue in which non-control-target packets (on which retention time adjustment is not performed) are stored. The queue 128c corresponds to the queue 28c (FIG. 9).

The queues in which control-target packets are stored are generated with respect to each TCP connection. The queues 128a and 128b are an illustrative example. The queue 128c temporarily accumulates packets according to types of non-control-target protocols or packets of a non-control-target TCP connection as needed.

The queues 128a, 128b, and 128c and queues 228a, 228b, and 228c described later are formed, for example, by using a storage area on the RAM 102. However, if the link I/F 104 or the link I/F 105 has a memory, the corresponding queues can be generated by using the memory.

The scheduler 39A is disposed in a stage subsequent to the queues 128a, 128b, and 128c. The scheduler 39A controls timing of readout of packets from the queues 128a, 128b, and 128c and sends read packets to the transmitting unit 201. The scheduler 39A corresponds to the scheduler 39 (FIG. 10).

A connection identification processing unit 238B (identification processing unit 238B), queues 228a, 228b, and 228c and a scheduler 39B are disposed on a packet transfer path in the uplink direction (PC→NW) between the receiving unit 202 and the transmitting unit 204.

The identification processing unit 238B has a type-of-protocol and TCP connection determination function and a function to sort a packet according to determination results, which are equivalent to those of the identification processing unit 238A.

The queues 228a, 228b, and 228c are disposed in a stage subsequent to the identification processing unit 238B. The queues 228a and 228b are an illustrative example of one or more queues for control targets. The queues 228a and 228b are generated with respect to each control-target TCP connection. The queue 228c is used to accumulate non-control-target packets.

The scheduler 39B is disposed in a stage subsequent to the queues 228a, 228b, and 228c. The scheduler 39B controls timing of readout of packets from the queues 228a, 228b, and 228c and sends read packets to the transmitting unit 204. The scheduler 39B corresponds to the scheduler 39 (FIG. 10).

Each of the identification processing unit 238A and the identification processing unit 238B is connected to a connection management unit 206. The connection management unit 206 manages a connection management table 207.

FIG. 13 illustrates an example of a data structure of the connection management table 207 (table 207). Referring to FIG. 13, the table 207 stores one or more entries each including a source (transmission source) IP address, a source port number, a destination IP address, a destination port number, a state, a start time, an aging timer, a transfer direction, and a measured RTT value. An entry is produced with respect to each TCP connection.

Referring again to FIG. 12, the connection management unit 206 is connected to an RTT measurement unit 208. The RTT measurement unit 208 measures RTT with respect to each TCP connection. The RTT measurement unit 208 is connected to a delay amount determination unit 209. The delay amount determination unit 209 corresponds to the stay time control unit 34 (FIG. 9).

The delay amount determination unit 209 obtains, with respect to a control-target TCP connection, an insert delay D, a gradient K and a delay amount D(t) by using downlink-direction line speed information (indicating the present bandwidth BWnow) about the link layer 2 (second link) input from the receiving unit 203 and RTT of the TCP connection notified from the RTT measurement unit 33, and by using the method described in the description of Embodiment 1, and notifies the scheduler 39B of the obtained values. The scheduler 39B determines timing of readout from the queue (queue 228a or 228b) for the corresponding packet by using the delay amount D(t).

The delay amount determination unit 209 also obtains, with respect to a control-target TCP connection, an insert delay D, a gradient K and a delay amount D(t) by using uplink-direction line speed information (indicating the present bandwidth BWnow) about the link layer 2 input from the transmitting unit 204 and RTT of the TCP connection notified from the RTT measurement unit 33, and by using the method described in the description of Embodiment 1, and notifies the scheduler 39A of the obtained values. The scheduler 39B determines timing of readout from the queue (queue 128a or 128b) for the corresponding packet by using the delay amount D(t).

The above-described identification processing units 238A and 238B, schedulers 39A and 39B, connection management unit 206, RTT measurement unit 33 and delay amount determination unit 209 are functions realized by the CPU 101 executing the traffic control program. The table 207 is stored, for example, in the RAM 102 or the flash ROM 103.

The functions of the identification processing units 238A and 238B, schedulers 39A and 39B, connection management unit 206, RTT measurement unit 33 and delay amount determination unit 209 can be implemented as functions of a processor, e.g., the above-described CPU 101 or a digital signal processor (DSP). The processor is an example of a "controller". The controller includes a programmable logic device (PLD) such as a field programmable gate array (FPGA).

Also, the functions of the identification processing units 238A and 238B, schedulers 39A and 39B, connection management unit 206, RTT measurement unit 33 and delay amount determination unit 209 may be implemented by means of a hardware logic (wired logic) using an integrated circuit (IC) such as a large scale integrated circuit (LSI) or an application specific integrated circuit (ASIC). That is, the above-described functions can be implemented by means of a "controller" formed by at least one of a processor, a PLD and an IC or a combination of two or more of the processor, PLD and IC.

The above-described implementation method can also be applied to the link bandwidth detection unit 32, RTT measurement unit 33, stay time control unit 34, flow sorting units 36A and 36B, protocol sorting unit 38 and scheduler 39 described above in the descriptions of Embodiments 1 to 4.

<Processing with CPU>

Figure 14:
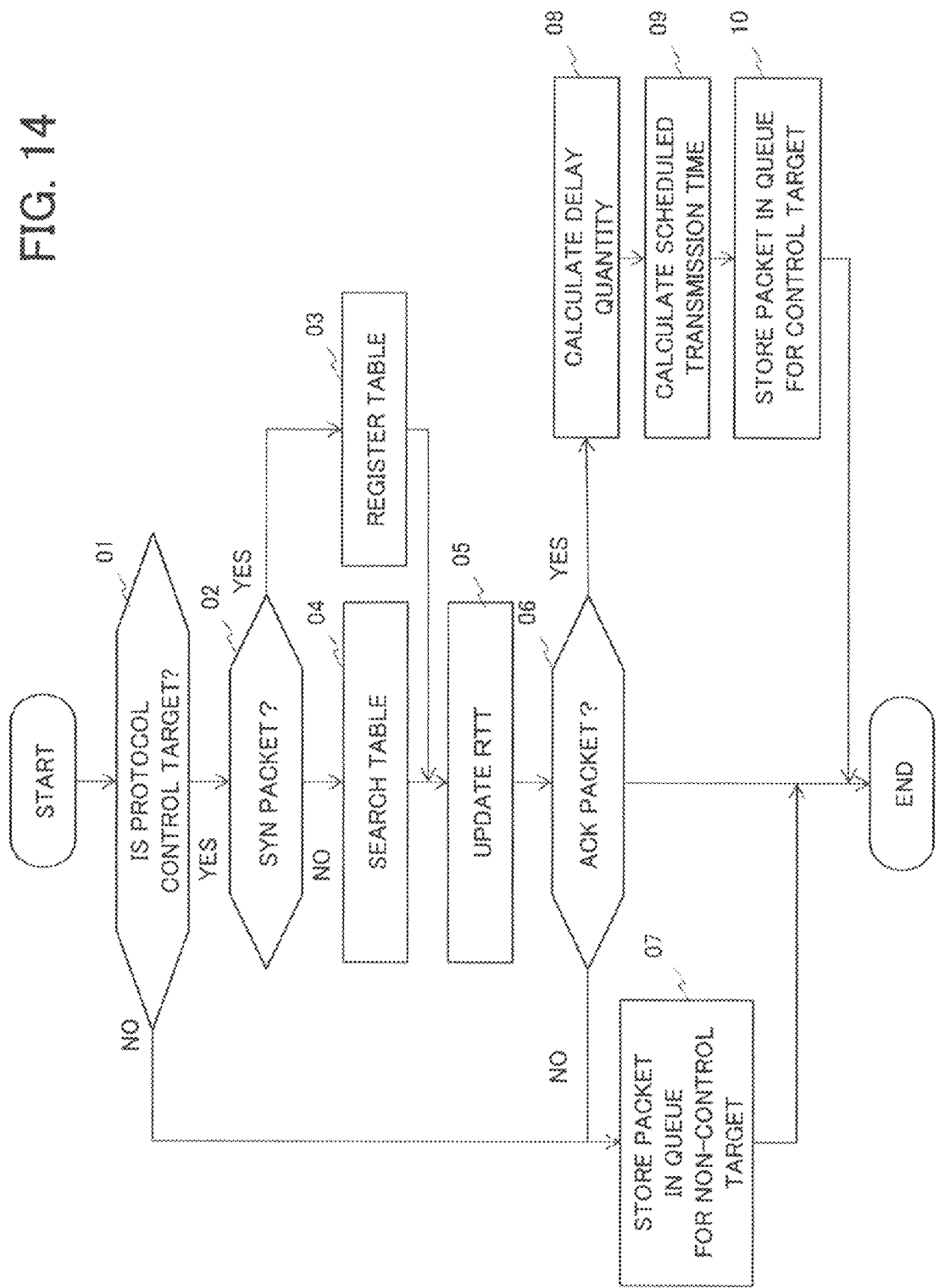
FIG. 14 is a flowchart illustrating an example of processing performed until a control-target packet is sorted in a queue.

FIG. 14 is a flowchart indicating an example of processing performed until a control-target packet is sorted in the queue. Processing illustrated in FIG. 14 is common processing performed both in the case of downlink transfer and in the case of uplink transfer. Processing in the case of downlink transfer will be described below by way of example.

Processing illustrated in FIG. 14 is started, for example, when a packet received by the link I/F 104 (receiving unit 202) is received by the CPU 101 through the bus B. First, in 01, the CPU 101 functions as identification processing unit 238B to determine whether or not the type of protocol for the packet is the control-target protocol (TCP). For example, the CPU 101 can determine whether the type of protocol is TCP or a protocol other than TCP from whether or not the protocol number included in the IP header of the packet is the number indicating TCP. If the type of protocol is not TCP (01, NO), the process advances to 07. If the type of protocol is TCP (01, YES), the process advances to 02.

In 02, the CPU 101 functions as connection management unit 206 to determine whether or not the TCP packet is a SYN packet indicating the beginning of establishing TCP connection. That is, the CPU 101 refers to the TCP header of the packet and determines whether or not a SYN flag is set.

Figure 15:
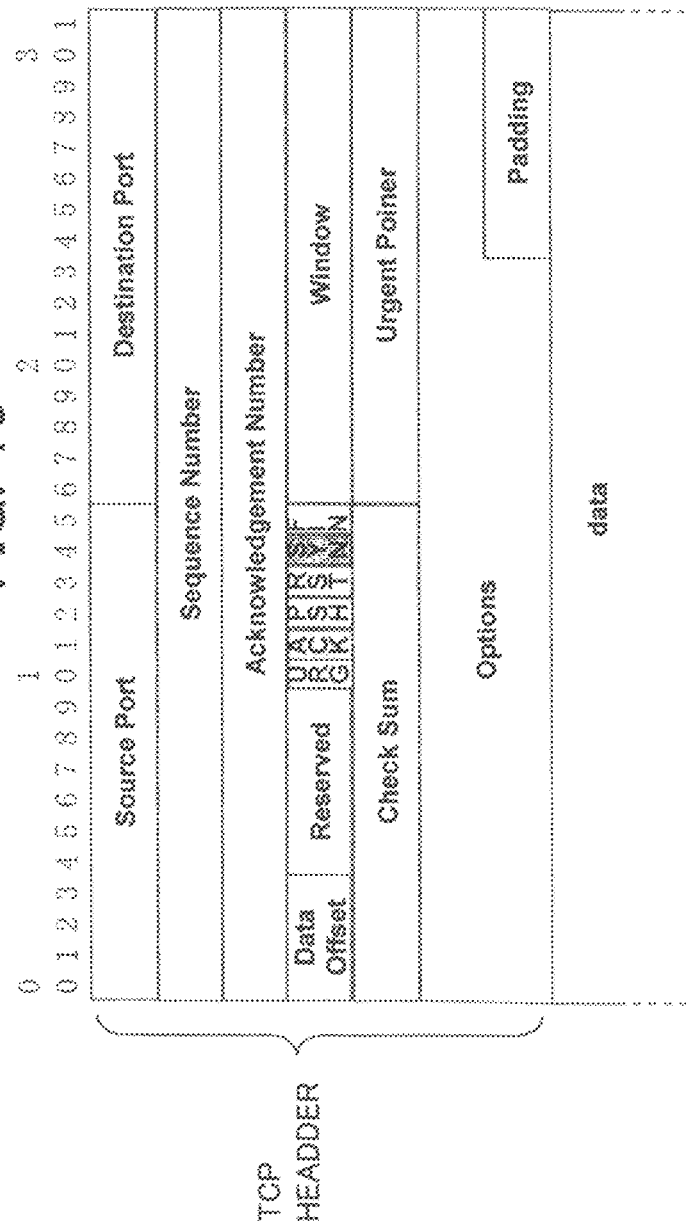
FIG. 15 illustrates a format of a TCP header.

FIG. 15 illustrates a format of a TCP header specified in RFC 783, and each of FIGS. 16A and 16B illustrates a format of a time stamp option which can be set in an option field of the TCP header specified in RFC 1323. In TCP, three procedures called three-way handshake are performed to establish a connection.

In the first procedure, one who makes a request for communication sends a SYN packet, i.e., a packet having a SYN flag set in its TCP header, to a correspondent at the other end. In the second procedure, the correspondent at the other end having received the SYN packet transmits a SYN-ACK packet (SYN+ACK) permitting the requester to connect. The SYN-ACK packet is a packet having a TCP header in which a SYN flag and an ACK flag (see FIG. 15) are set. Third, the requester having received the SYN-ACK packet transmits to the requester an ACK packet indicating the beginning of making the connection (a TCP packet in which the SYN flag is off and an ACK flag is set) and starts communication with the correspondent at the other end.

In the SYN packet, a random value A is set as sequence number. In the SYN-ACK packet, a value (A+1) is set as acknowledgement reply number and a random value B is set as sequence number. Further, in the ACK packet, a value (B+1) is set as acknowledgement reply number.

If the packet is a SYN packet (02, YES), the CPU 101 advances the process to 04. On the other hand, if the packet is not a SYN packet (02, NO), the CPU 101 advances the process to 03.

In 03, the CPU 101 functions as connection management unit 206 to register an entry relating to the new TCP connection in the Table 207 (FIG. 13). In the entry, a source IP address, a source port number, a destination IP address and a destination port number used as a connection identifier are set. Further, a state "SYN" (indicating that the establishment procedure is underway) is stored.

A state "ESTB" indicates the completion of establishment of the connection, and a state "IDLE" indicates an idle state. A state "FIN" indicates a state where a packet (FIN packet) in which a FIN flag for requesting connection termination is set is transmitted. A state "FIN-W" indicates a state where reply packet as a reply to the FIN packet is being awaited.

As a start time, a time stamp value (TS value) in the option field of the time stamp illustrated in FIG. 16A or 16B is stored. The aging timer indicates an extension time period before the start of a forcible connection termination procedure provided as a preparation for an abnormal termination of the connection. The transfer direction indicates transmission or reception from the monitoring-target link. In the example of the operation, the receiving side of the link layer 2 is the target to be monitored and, therefore, the uplink direction corresponds to "transmission" and the downlink direction corresponds to "reception". An RTT value measured by the RTT measurement unit 33 is stored as measured RTT value. After the completion of 03, the process advances to 05.

In 04, the CPU 101 functions as connection management unit 206 to search the table 207 for the entry corresponding to the received TCP packet. The CPU 101 updates the entry with information contained in the TCP header of the TCP packet. The process thereafter advances to 05.

In 05, the CPU 101 functions as RTT measurement unit 33 to measure RTT for the TCP connection identified from the entry registered in 03 and updated in 04. As a measuring method, the method 1 or the method 2 described in the description of Embodiment 1 is used. For example, the CPU 101 measures RTT by the method 2 using the time stamp value in the option header (FIG. 16A or 16B). After the completion of RTT measurement, the CPU 101 updates the RTT value in the corresponding entry in the Table 207 with the new RTT value.

Processing in 06 and processing subsequent to 06 are executed after the RTT value is updated. In 06, the CPU 101 functions as identification processing unit 238B to determine whether or not the packet is an ACK packet. If the packet is an ACK packet (06, YES), the process advances to 08. If the packet is not an ACK packet, the process advances to 07.

In 07, the CPU 101 functions as identification processing unit 238B to store the packet in the non-control-target queue (e.g., queue 228c).

In 08, the CPU 101 performs delay amount computation processing. That is, the CPU 101 functions as connection management unit 206 to refer to the table 207 and read out the RTT value stored in the entry for the connection corresponding to the ACK packet. Subsequently, the CPU 101 functions as delay amount determination unit 209 to obtain line speed information (information indicating the present bandwidth) from the transmitting unit 204 and compute the insert delay D, the gradient K and the delay amount D(t) by using the RTT value and the line speed information. A method of computing the insert delay D and other values is performed by using equations (1) to (6) described in the description of Embodiment 1.

In 09, the CPU 101 functions as delay amount determination unit 209 to obtain the gradient K and the delay amount D(t) and compute a scheduled transmission time t out (t out=t now+D(t)) for the ACK packet. The scheduled transmission time is notified to the scheduler 39B together with information for identification of the queue storing the ACK packet (stored at a predetermined address in the RAM 102).

In 10, the CPU 101 functions as identification processing unit 238B to store the ACK packet in the control-target queue (e.g., queue 228a) prepared with respect to each connection. The above processing ended by this operation is the processing performed until the control-target packet is sorted in the stay-time-adjustable queue.

Figure 17:
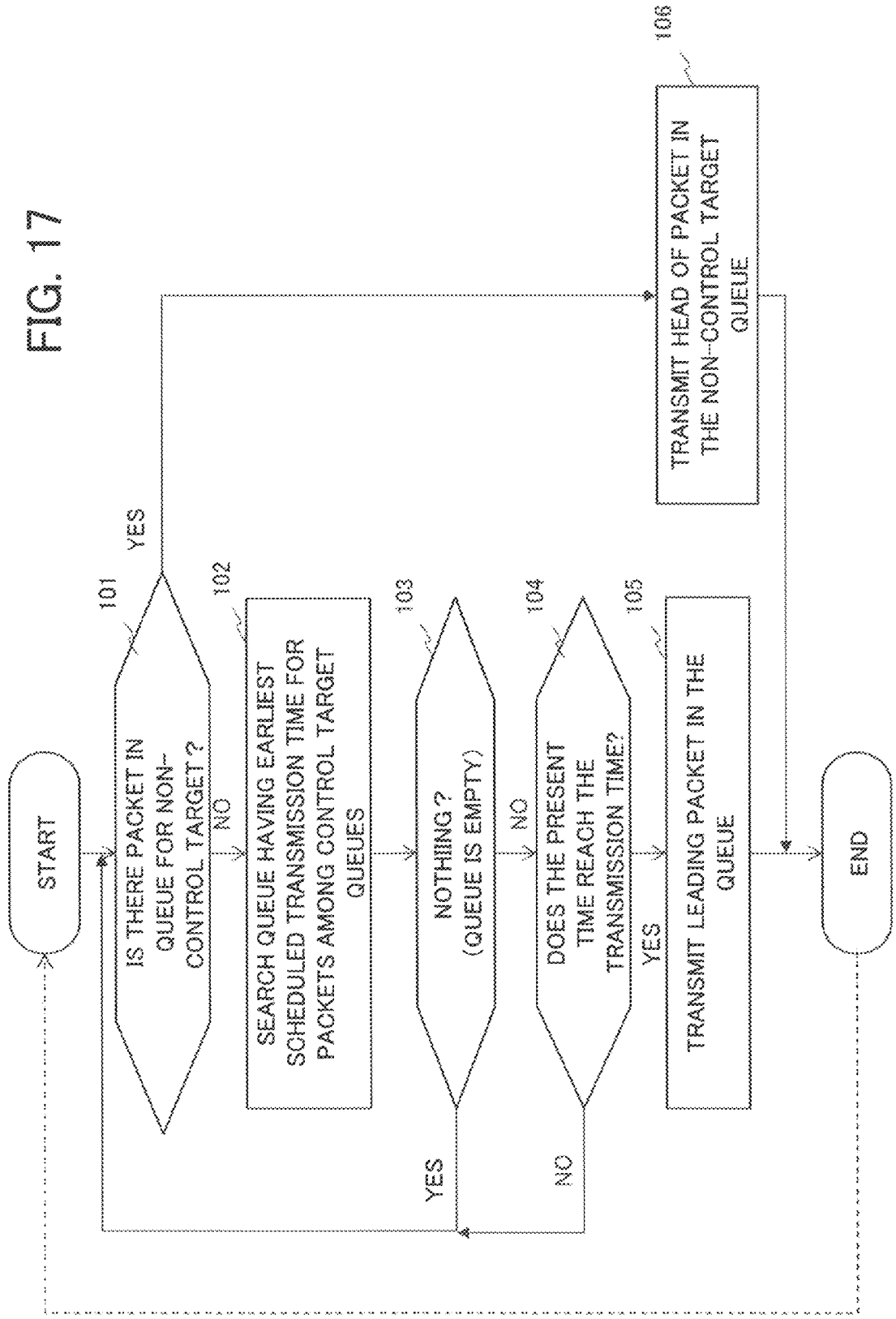
FIG. 17 is a flowchart illustrating an example of processing for reading out a packet stored in a control-target queue.

FIG. 17 is a flowchart indicating an example of processing for reading out a packet stored in the control-target queue. Processing illustrated in FIG. 17 is common processing performed both in the case of downlink transfer and in the case of uplink transfer. Processing in the case of downlink transfer will be described below by way of example. That is, a case where processing illustrated in FIG. 17 is executed by the CPU 101 functioning as scheduler 39B will be described.

First, in 101, the CPU 101 determines whether or not any packet is stored (accumulated) in the non-control-target queue (queue 228c). If a packet is accumulated (101, YES), the process advances to 106. If no packet is accumulated (101, NO), the process advances to 102.

In 102, the CPU 101 searches for the (first) queue having the leading packet (the head of packet) with the earliest scheduled transmission time (transmission time) among the control-target queues (queues 228a and 228b).

In 103, the CPU 101 determines whether or not a corresponding queue is found by search. If all the control-target queues are empty at this time (103, NO), the process returns to 101. If there is a corresponding queue (103, YES), the process advances to step 104.

In 104, the CPU 101 determines whether or not the current time has reached the transmission time. If the current time has not reached the transmission time (104, NO), the process returns to 101. If the current time has reached the transmission time (104, YES), the process advances to 105.

In 105, the CPU 101 reads out the leading packet in the corresponding queue and performs processing for transmitting this packet. In 106, the CPU 101 transmits the leading packet in the non-control-target queue. The packet is transmitted from the transmitting unit 204 (link I/F 105) to the network and sent to the CN. After the completion of 105 or 106, the process returns to 101, and processing in 101 and processing subsequent to 101 are repeatedly executed.

In a case where the processing in FIGS. 14 and 17 is applied to uplink transfer, the CPU 101 functions as identification processing unit 238A and scheduler 39A and the queues 128a, 128b, and 128c are used. Processing performed by the CPU 101 functioning as connection management unit 206, RTT measurement unit 33 and delay amount determination unit 209 is the same as the processing in the case of downlink transfer.

<Example of Operation>

As an example of the operation of the communication adaptor 100, an example of the operation when the PC 110 establishes a TCP connection with a correspondent at the other end (CN) and TCP communication (TCP/IP communication) is executed between the PC 110 and the CN will be described.

When a data packet relating to the TCP connection is transmitted from the PC 110 to the network (CN) (when uplink transfer is performed), the data packet is received by the receiving unit 202 (link I/F 104) of the link layer 1. The data packet is then transmitted to the second link from the transmitting unit 204 (link I/F 105, PHY/RF unit 106) of the link layer 2.

The data packet reaches the correspondent at the other end (CN) via the base station and the network. On the other hand, an ACK packet transmitted from the CN with respect to the data packet arrives at the receiving unit 203 of the link layer 2 (second link) and is sent out from the transmitting unit 201 of the link layer 1 (first link) to reach the PC 110.

The data packet received by the receiving unit 202 undergoes processing for identification of the type of protocol and the TCP connection in the identification processing unit 238B and is stored (sorted) in the queue according to the identification results. For example, a setting is made in the identification processing unit 238B such that ACK packets in TCP connections are stored in the control-target queues while packets other than the ACK packets are stored in the non-control-target queue.

The data packet is therefore stored in the non-control-target queue 228c. The scheduler 39B reads out the data packet from the queue 228a upon performing coordination with readout of packets from the other queues, and sends the read data packet to the transmitting unit 204.

The CN having received the data packet returns an ACK packet corresponding to the data packet. The ACK packet passes through the network, the base station and the link layer 2 to reach the receiving unit 203 (link I/F 105) of the communication adaptor 100.

The identification processing unit 238A then identifies the TCP connection to which the ACK packet belongs, and the delay amount determination unit 209 computes the delay amount (delay time) to be given to the delay time adjustment queue (control-target queue, e.g., queue 128a) associated with the identified TCP connection. The ACK packet is thereafter enqueued into the queue 128a.

At a point in time after a lapse of the delay time period, the scheduler 39A reads out the ACK packet from the queue 128a upon coordination with sending out from the other queues, and the ACK packet is sent out from the transmitting unit 201 to the local link side (PC 110).

The delay time to be given is determined by using the bandwidth (communication speed) of the sending out interface of the link layer 2 (i.e., the uplink) and RTT of the TCP connection. Measurement of RTT (measuring) is performed by using the time at which the data packet relating to the TCP connection passes through the identification processing unit and the time at which the ACK packet corresponding to the data packet passes through the identification processing unit, as described above, and the RTT value stored in the table 207 is updated as occasion demands.

When a data packet relating to the TCP connection is transmitted from the CN to the PC 110 (when downlink transfer is performed), the data packet is received by the receiving unit 203 and sent out from the transmitting unit 201. The PC 110 having received the data packet transmits an ACK packet corresponding to the data packet. The ACK packet is received by the receiving unit 202 via the first link and is transmitted from the transmitting unit 204 to the second link to finally reach the CN.

When the data packet is received by the receiving unit 203, the identification processing unit 238A sorts the data packet into the non-control-target queue 128c. The scheduler 39A reads out the data packet from the queue 128c after adjusting readout timing in relation to the other queues. The data packet read out is transmitted from the transmitting unit 201 to the PC 110 through the first link.

When the PC 110 transmits the ACK packet with respect to the data packet, the ACK packet is received by the receiving unit 202. At this time, the TCP connection relating to the ACK packet is identified by the identification processing unit 238B and the connection management unit 206, and the delay amount (insert delay: delay time) to be given to the ACK packet is computed from the RTT value of the TCP connection and the bandwidth (line speed information) of the reception interface (downlink) of the link layer 2 obtained from the receiving unit 203. The ACK packet is stored in the corresponding control-target queue (e.g., queue 228a).

At a point in time after a lapse of the delay time period, the scheduler 39B reads out the ACK packet from the queue 228a. The ACK packet is sent out from the transmitting unit 204 to the link layer 2. The delay time period is determined by using the bandwidth (communication speed) of the reception interface (=downlink) of the link layer 2 (second link) and RTT of the TCP connection. Measurement of RTT is performed at whatever time by using the times at which the packets (data packet, ACK packet) in the packet flow relating to the TCP connection pass, thereby always updating the RTT value in the table 207.

To suitably perform connection identification, the occurrence and termination of TCP connections through which packets pass are monitored and active connections and information for identification of the active connections are stored in the table 207.

In the case of TCP, establishment (generation) of a connection is performed by monitoring the flow of three-way handshake started by transmitting a SYN packet, as described above. On the other hand, termination of a connection is performed by monitoring a cutting sequence started by transmitting a TCP packet (FIN packet) in which a FIN flag is set.

TCP connections are managed by means of the table 207 as illustrated in FIG. 13. Identification of TCP connections and RTT value management are performed by using the table 207. Also, each entry in the table 207 is provided with an aging timer by considering dealing with an abnormal termination of the connection. Such a TCP state transition and a connection determination technique based on the state transition are known as a state inspection technique. The spate inspection technique is known per se and, therefore, will not be described.

As described above, the communication adaptor 100 gives (adds) a delay according to the bandwidth of the second link to each of ACK packets in the downlink and uplink directions with respect to a TCP connection, thereby enabling efficient control of the transmission rate (throughput) of data packets according to variations in bandwidth in the two directions: the downlink direction and the uplink direction.

Embodiment 5 can obtain the same effects and advantages as those in the above-described Embodiments 1 to 4. That is, in Embodiment 5, an insert delay according to the link bandwidth is given to one of two packet flows in a TCP connection to enable the throughput of the other packet flow to be controlled to a value according to the link bandwidth.

In Embodiment 5, control can be performed so that packets other than those of a control-target protocol (TCP) can always be stored in a queue into which no delay is inserted (queue 128c or queue 228c).

In Embodiment 5, the insert delay amount is determined according to the result of measurement of RTT and the bandwidth (communication speed) of the first link in the same way as in Embodiments 1 to 4. Identification of types of protocol and connections is not indispensable to Embodiment 5. For example, in a case where latency for a link section on which the above-described control is to be performed is a major factor in determination of RTT of connections flowing through this link, RTT of one connection can be used as a representative value or a typical value of RTT can be used as a fixed value.

In such a case, since a common additional delay time (insert delay D) may be given with respect to a control-target protocol (e.g., TCP), queues for the control-target protocol can be combined into one among a plurality of connections. A configuration for adding an insert delay with respect to only one of the uplink direction and the downlink direction may be adopted in place of the configuration of Embodiment 5.

In Embodiment 5, the delay amount D(t) can be controlled so that the delay amount D(t) is continuously changed to finally reach the insert delay D, thereby avoiding occurrence of an unnecessary packet spacing and packet outstripping.

In Embodiment 5, RTT is measured for each of connections and different insert delays are computed for the connections, thereby enabling throughput (traffic) control according to RTTs of the connections.

In Embodiment 5, equation (2) presented above is used for computation of the insert delay D. Changes in bandwidth delay product (BDP) are thereby canceled out from the viewpoint of a connection in which a delay is inserted, so that the window size can be maintained at a suitable value.

In Embodiment 5, the gradient K and the delay amount D(t) computed by using equations (5) and (6) presented above are applied, thereby enabling the amount of delay to be continuously changed.

In Embodiment 5, a configuration for giving a delay to ACK packets is adopted. If a sequence of packets to which an amount of delay is given are closely packed, it is not possible to perform control in the direction of reducing the amount of applied delay. The delay amount control explained in the description of the embodiment is performed according to the bandwidth of the monitoring-target link, whose bandwidth varies. Therefore, the described delay amount control is advantageous if the monitoring-target link is a bottleneck link.

In a case where the monitoring-target link is a bottleneck, however, data packets are ordinarily flows in such state that there are substantially no spaces therebetween. In such a case, there is a possibility of a failure to perform control in the direction of reducing the delay amount. On the other hand, the rate of transmission of ACK packets is based on the rate of transmission of data packets, which are a cause of occurrence of ACK packets. In ordinary cases, however, there are substantial spaces between ACK packets since the ACK packets have no data portions. Also, because ACK packets arranged while being reduced in number relative to a plurality of data packets can be transmitted, the intervals at which ACK packets are transmitted tend to be larger than data packet intervals.

Therefore, insertion of a delay amount according to the bandwidth, as described above, is easier than insertion between data packets. Also, a queue (buffer) for temporarily accumulating packets is prepared to give a delay. Since ACK packets are smaller in size than data packets, the size (capacity) of the queue can be made smaller. A delay inserted for the purpose of increasing the apparent RTT (recognized by TCP) has the same effect irrespective of the insertion position in the packet flow, in a forward path or a backward path for the packet flow. It is, therefore, preferable to apply a delay to traffic at a side at which ACK packets flow.

In the communication adaptor in Embodiment 5, control described below can also be performed. That is, at a point in time at which a newly established TCP connection is detected, the delay amount to be added is set to a minimum value. For example, the minimum value is 0. When this value is 0, no delay is added. However, a different minimum value larger than 0 may be set in advance. The delay amount is thereafter increased gradually with passage of time to finally reach the value of the insert delay D. The delay amount may be controlled so as to increase in proportion to the amount of time elapsed. An increasing method of converging the delay amount at an exponential rate is also conceivable.

As a time period taken to reach the original added delay amount (or a value in the vicinity thereof, e.g., the value of insert delay D), a suitable time can be determined with reference to the time needed for slow starting through the corresponding connection. A fixed value, e.g., one second may alternatively be used. This is effective in limiting a reduction in the pace of increase in throughput at the beginning of slow starting, which is an adverse effect of giving the delay.

More specifically, it is assumed that at a point in time at which communication is started with establishment (generation) of a new TCP connection using the second link, the link bandwidth (BWnow) of the second link is lower than the maximum bandwidth (BWmax) of the link. Under this condition, communication is to be started with a length of RTT according to the reduction in link bandwidth as RTT seen on the connection (appearing between the ends).

According to TCP, however, control (slow start control) is performed by using a minimum or smaller window size at the time of starting communication and by gradually increasing the window size until a packet overflow occurs. The rate at which the window size extends (increases) tends to be slower if RTT is larger.

Therefore, if the insert delay D at the time of starting communication is large, it takes time for the window size in the connection to reach the size according to the current link bandwidth. Also, in a case where the amount of data flowing through the connection is small, there is a possibility of the communication being terminated during slow starting. Thus, because of insertion of the insert delay D at the time of starting communication accompanying the establishment of the connection, it takes time to reach the throughput at which the link bandwidth can be effectively used, or there is a possibility of communication being terminated before a good throughput is reached.

Figure 18:
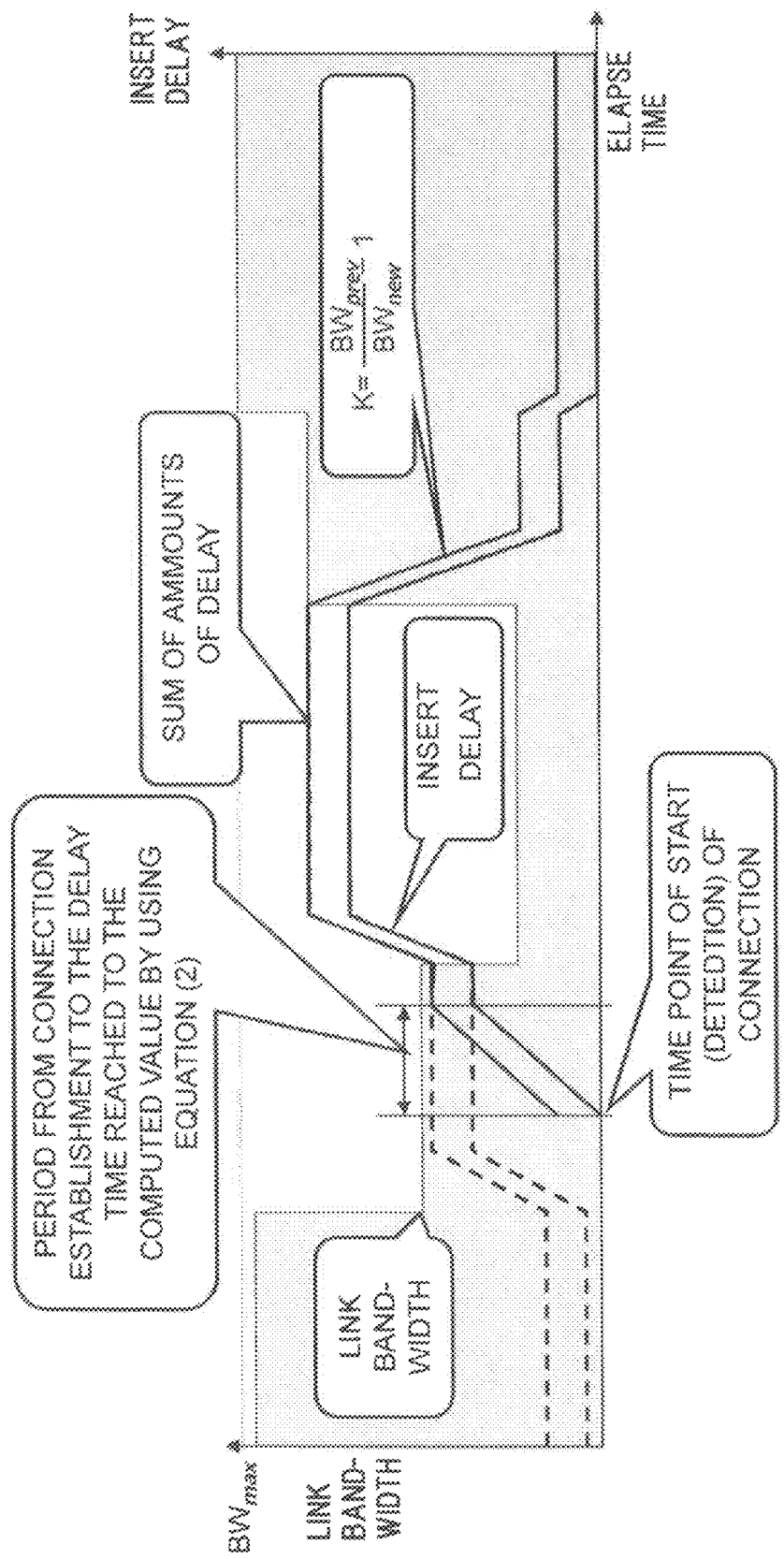
FIG. 18 illustrates an example of a method of giving an amount of delay.

Therefore, control relating to giving delay amounts as illustrated in FIG. 18 may be performed. That is, the amount of insert delay at the time of starting a connection (at a point in time at which a new connection is detected in the communication adaptor 100) is set to a minimum value (e.g., 0) and is gradually increased from this value so as to converge in a suitable time period on the value of the insert delay D computed by using equation (2), thus enabling limiting or reducing the above-described adverse effect.

Embodiment 5 has been described with respect to a mode in which traffic control by insertion of a delay is performed by the processor (CPU 101) in the communication adaptor 100 executing a piece of software (program). While an example of installation of a program in the communication adaptor 100 by the PC 110 has been described in the above-described example, a configuration in which the program for traffic control is stored as a piece of firmware in the flash ROM 103 in advance may be adopted. A configuration may alternatively be applied in which the program for traffic control stored in the PC 110 or on the storage (recording) medium 111 in advance is downloaded onto the RAM 102 by the communication adaptor 100 when needed.

Figure 19:
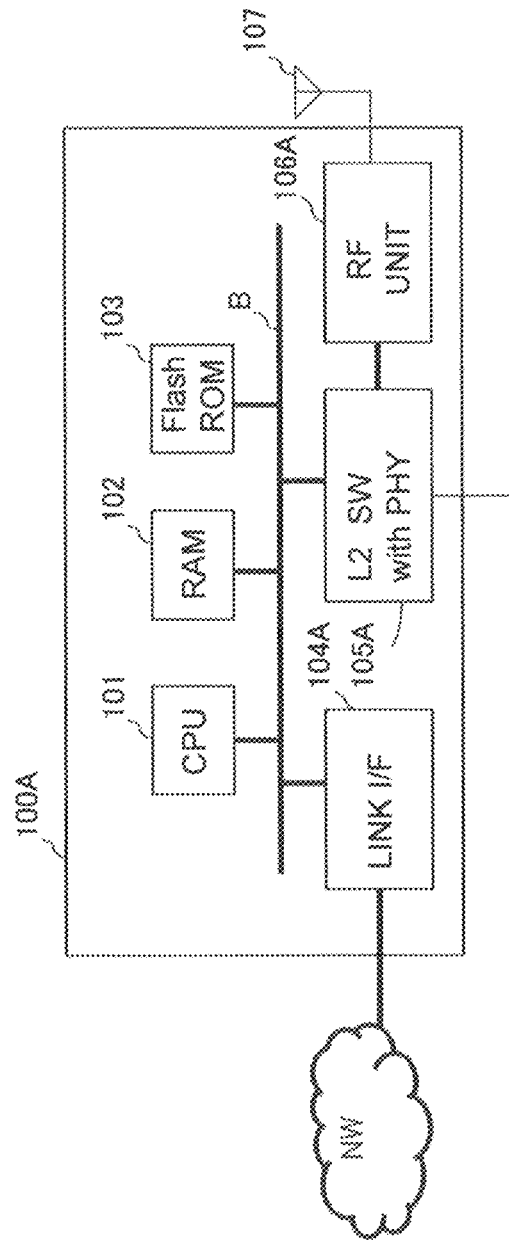
FIG. 19 illustrates an example of a hardware configuration of a mobile router which is an example of the communication node.

Other hardware configuration examples of the communication node will be described. FIG. 19 illustrates an example of a hardware configuration of a mobile router 100A. For example, the mobile router 100A can be applied as CPE 13 illustrated in FIG. 1. The mobile router 100A has an antenna 107 and an RF unit 106A as a wireless interface. The mobile router 100A can connect wirelessly to a terminal by using the wireless interface.

Further, the mobile router 100A has a layer 2 switch and a PHY chip 105A (chip 105A) which provides a LAN-side interface. The chip 105A has ports for accommodating a plurality of LAN lines. One of the ports is connected to the RF unit 106A. A link I/F 104A provides a WAN-side interface and is connected to the network (NW).

The chip 105A has a memory usable as a queue and also includes a piece of hardware (an electronic circuit, an integrated circuit) which functions as a scheduler. Since traffic control described in the descriptions of Embodiments 1 to 5 is processing performed mainly in the layer 2 (L2), the functions of a queue and a scheduler may be implemented in the layer 2 switch (L2SW) provided in the chip 105A.

Each of identification of types of protocols, identification of connections and RTT measurement is processing corresponding to layer 3 or a higher layer. Therefore, this processing is implemented, for example, as processing based on execution of a program by the CPU 101. Queueing control and scheduler control are also performed by the CPU 101. The program executed by the CPU 101 is stored on the flash ROM 103. These processings performed by the CPU 101 may alternatively be implemented by means of a piece of special purpose hardware (integrated circuit).

Figure 20:
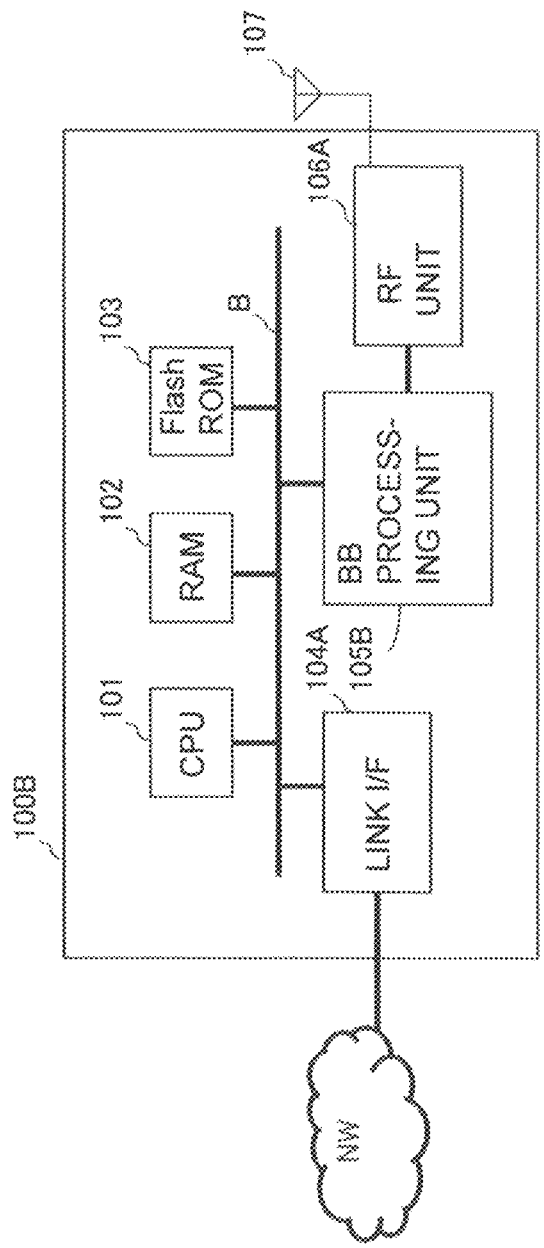
FIG. 20 illustrates an example of a hardware configuration of a base station which is an example of the communication node.

FIG. 20 illustrates an example of a hardware configuration of a base station 100B as an example of the communication node. The base station 100B, for example, can be applied to each of the base station (BS) 6, the base station 7 and femto base station 8 illustrated in FIG. 1.

The base station 100B differs from the mobile router 100A in that a BB processing unit 105B which performs processing relating to a baseband signal is provided in place of the chip 105A. When a terminal is connected to the network (NW), a logic line called a bearer is established between the terminal and the network. The bearer includes a U-plane bearer passing through the RF unit 106A, the BB processing unit 105B, the link I/F (line interface) 104. A TCP connection is provided in this bearer.

The CPU 101 in the base station 100B loads a program stored on the Flash ROM 103 onto the RAM 102 and executes the program. The CPU 101 can thereby peer into TCP packets transmitted and received through the link I/F and execute traffic control by delay insertion according to the link bandwidth, as described in any of the descriptions of Embodiments 1 to 5. Monitoring-target links in the mobile router 100A and the base station 100B are, for example, downlink-side wireless links in the mobile router 100A and the base station 100B, respectively.

As described above, traffic control described in any of the descriptions of Embodiments 1 to 5 is executed to enable the throughput of a TCP connection to be adjusted by a method different from throughput adjustment based on TCP.

That is, when the link bandwidth of the monitoring target is reduced, the amount of insert delay is increased, thereby avoiding a packet loss due to a queue overflow caused by a reduction in link bandwidth due to throughput adjustment under TCP.

When the link bandwidth of the monitoring target is increased (expanded), the amount of insert delay is reduced, thereby enabling the throughput to follow the increase in the link bandwidth (increase) more efficiently in comparison with throughput adjustment under TCP. Therefore, wasting of the bandwidth as a result of failure to efficiently follow the increase in link bandwidth can be avoided. Thus, in Embodiments 1 to 5, the efficiency of use of the line bandwidth can be improved and an effect of obtaining an increased throughput can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication node disposed on a packet transfer path through which packets flow between an end of a transmitting side and an end of a receiving side according to a specific protocol under which flow control and congestion control using a window size are performed, the communication node comprising:
    a communication interface configured to perform processing for receiving a packet from a link on the packet transfer path and processing for transmitting a packet to the link;
    a storage device configured to store a queue used to temporarily accumulate a packet in accordance with the specific protocol, wherein the packet is received from the link or transmitted to the link; and
    a controller configured to adjust retention time that is a period of time for retaining a packet accumulated in the queue based on a current bandwidth in a receiving direction of the link, wherein the controller is configured to use a criterion that the retention time becomes zero when a bandwidth in the receiving direction is maximum, and to increase the retention time in response to increase of an amount of the bandwidth in the receiving direction that lowers from a given value, and wherein the accumulated packet is retained in the queue until expiration of the retention time.

2. The communication node according to claim 1, wherein the controller is configured to determine a type of protocol for a packet received from the link or a packet transmitted to the link, and is configured to retain the packet in the queue when the type of protocol designates the specific protocol.

3. The communication node according to claim 1, wherein the controller is configured to compute a time period for retaining a packet accumulated in a queue by using a round trip time obtained by observation of packets in accordance with the specific protocol and the current bandwidth in the receiving direction of the link.

4. The communication node according to claim 1, wherein the controller is configured to adjust retention time that is a time period for retaining a packet accumulated in the queue so that the retention time for each packet accumulated in the queue is changed and a time length of the retention time reach a predetermined time length.

5. The communication node according to claim 4, wherein when establishment of a new connection is detected, the controller obtains a delay amount to be given to the connection and adjusts a time period for retaining a packet accumulated in a queue corresponding to the connection so that an initial delay amount given to the connection is 0 or a minimum value, and the obtained delay amount is thereafter reached in a time period determined with respect to the connection.

6. The communication node according to claim 1, wherein the specific protocol establishes a connection between the ends when communication between the ends is started,
    wherein the storage device is configured to store queues associated with connections, and
    wherein the controller is configured to perform processing for determining a connection for packets in accordance with the specific protocol, wherein the packets are received from the link or transmitted to the link, and accumulating packets in any of the queues corresponding to the result of determination of the connection, and processing for obtaining round trip time with respect to each of the packets accumulated in each of the queues and computing a time period for retaining a packet accumulated in a queue.

7. The communication node according to claim 1, wherein the queue is used to accumulate an acknowledgement packet including no data part.

8. A communication node disposed on a packet transfer path through which packets flow between an end of a transmitting side and an end of a receiving side according to a specific protocol under which flow control and congestion control using a window size are performed, the communication node comprising:
    a communication interface configured to perform processing for receiving a packet from a link on the packet transfer path and processing for transmitting a packet to the link;
    a storage device configured to store a queue used to temporarily accumulate a packet in accordance with the specific protocol, wherein the packet is received from the link or transmitted to the link; and
    a controller configured to adjust a period of time for retaining a packet accumulated in the queue based on a current bandwidth in a receiving direction of the link, wherein the controller is configured to obtain a delay amount D to be used for adjustment of a time period for retaining a packet accumulated in a queue, by using a value RTT of round trip time, a maximum bandwidth $BW_{max}$ in the receiving direction of the link and a current bandwidth $BW_{now}$ in the receiving direction of the link, and by calculating the following equation:

$$D = RTT \times \{(BW_{max} - BW_{now})/BW_{now}\}.$$

9. The communication node according to claim 8, wherein when the controller changes the time period for retaining the packet accumulated in the queue so that the time period becomes equal to a retention time corresponding to the delay amount D, the controller obtains a gradient K of change by using a preceding bandwidth $BW_{prev}$ and a new bandwidth $BW_{new}$ and by calculating the following equation:

$$K=(BW_{prev}/BW_{new})-1$$

and obtains a delay amount D(t) per unit time by calculating the following equation:

$$D(t)=D(t0)+K(t-t0).$$

10. A non-transitory computer-readable recording medium having stored therein a program for causing a computer, which is disposed on a packet transfer path through which packets flow between a transmitting-side end and a receiving-side end according to a specific protocol under which flow control and congestion control using a window size are performed, to execute a process comprising:

receiving a packet from a link on the packet transfer path;
transmitting a packet to the link;
accumulating in a queue a packet in accordance with the specific protocol, wherein the packet is received from the link or transmitted to the link; and
adjusting retention time that is a period of time for retaining a packet accumulated in the queue based on a current bandwidth in a receiving direction of the link, wherein the adjusting includes using a criterion that the retention time becomes zero when a bandwidth in the receiving direction is maximum, and increasing the retention time in response to increase of an amount of the bandwidth in the receiving direction that lowers from a given value, and wherein the accumulated packet is retained in the queue until expiration of the retention time.

11. A method of traffic controlling a communication node disposed on a packet transfer path through which packets flow between an end of a transmitting side and an end of a receiving side according to a specific protocol under which flow control and congestion control using a window size are performed, the method comprises:

receiving a packet from a link on the transfer path;
transmitting a packet to the link;
accumulating in a queue a packet in accordance with the specific protocol, wherein the packet is received from the link or transmitted to the link; and
adjusting retention time that is a period of time for retaining a packet accumulated in the queue based on a current bandwidth in a receiving direction of the link, wherein the adjusting includes using a criterion that the retention time becomes zero when a bandwidth in the receiving direction is maximum, and increasing the retention time in response to increase of an amount of the bandwidth in the receiving direction that lowers from a given value, and wherein the accumulated packet is retained in the queue until expiration of the retention time.

12. A non-transitory computer-readable recording medium having stored therein a program for causing a computer, which is disposed on a packet transfer path through which packets flow between a transmitting-side end and a receiving-side end according to a specific protocol under which flow control and congestion control using a window size are performed, to execute a process comprising:

receiving a packet from a link on the packet transfer path;
transmitting a packet to the link;
accumulating in a queue a packet in accordance with the specific protocol, wherein the packet is received from the link or transmitted to the link; and
adjusting a period of time for retaining a packet accumulated in the queue based on a current bandwidth in a receiving direction of the link, wherein the adjusting includes obtaining a delay amount D to be used for adjustment of a time period for retaining a packet accumulated in a queue, by using a value RTT of round trip time, a maximum bandwidth $BW_{max}$ in the receiving direction of the link and a current bandwidth $BW_{now}$ in the receiving direction of the link, and by calculating the following equation:

$$D=RTT\times\{(BW_{max}-BW_{now})/BW_{now}\}.$$

13. A method of traffic controlling a communication node disposed on a packet transfer path through which packets flow between an end of a transmitting side and an end of a receiving side according to a specific protocol under which flow control and congestion control using a window size are performed, the method comprises:

receiving a packet from a link on the transfer path;
transmitting a packet to the link;
accumulating in a queue a packet in accordance with the specific protocol, wherein the packet is received from the link or transmitted to the link; and
adjusting a period of time for retaining a packet accumulated in the queue based on a current bandwidth in a receiving direction of the link, wherein the adjusting includes obtaining a delay amount D to be used for adjustment of a time period for retaining a packet accumulated in a queue, by using a value RTT of round trip time, a maximum bandwidth $BW_{max}$ in the receiving direction of the link and a current bandwidth $BW_{now}$ in the receiving direction of the link, and by calculating the following equation:

$$D=RTT\times\{(BW_{max}-BW_{now})/BW_{now}\}.$$

* * * * *